(12) United States Patent
Wu et al.

(10) Patent No.: US 12,028,775 B2
(45) Date of Patent: Jul. 2, 2024

(54) NETWORK-ASSISTED POSITIONING FOR SIDELINK COMMUNICATIONS

(71) Applicant: QUALCOMM Incorporated, San Diego, CA (US)

(72) Inventors: Shuanshuan Wu, San Diego, CA (US); Junyi Li, Fairless Hills, PA (US); Hong Cheng, Basking Ridge, NJ (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 17/502,596

(22) Filed: Oct. 15, 2021

(65) Prior Publication Data

US 2023/0121104 A1    Apr. 20, 2023

(51) Int. Cl.
| | |
|---|---|
| H04W 4/029 | (2018.01) |
| G01S 19/46 | (2010.01) |
| G01S 19/51 | (2010.01) |
| H04W 28/24 | (2009.01) |
| H04W 48/10 | (2009.01) |

(52) U.S. Cl.
CPC ............. *H04W 4/029* (2018.02); *G01S 19/46* (2013.01); *G01S 19/51* (2013.01); *H04W 28/24* (2013.01); *H04W 48/10* (2013.01)

(58) Field of Classification Search
CPC ....... H04W 4/40; H04W 92/18; H04W 64/00; H04W 72/23; H04W 4/02; H04W 4/023; H04W 4/46; H04W 4/029; H04W 28/24; H04W 48/10; G01S 5/0072; G01S 19/46; G01S 19/51
See application file for complete search history.

(56) References Cited

U.S. PATENT DOCUMENTS

| | | | |
|---|---|---|---|
| 2003/0134647 A1* | 7/2003 | Santhoff | G01S 13/876 455/456.1 |
| 2004/0002346 A1* | 1/2004 | Santhoff | H04L 1/203 455/456.2 |
| 2018/0020496 A1* | 1/2018 | Vanderveen | H04W 84/02 |
| 2021/0385619 A1* | 12/2021 | Balasubramanian | ... H04W 4/02 |
| 2022/0236365 A1* | 7/2022 | Ko | H04L 5/0048 |
| 2022/0312169 A1* | 9/2022 | Cao | H04W 36/324 |

(Continued)

FOREIGN PATENT DOCUMENTS

WO    WO-2022194376 A1 *   9/2022   ............ H04W 64/00

*Primary Examiner* — Dung Hong
(74) *Attorney, Agent, or Firm* — Holland & Hart LLP

(57) ABSTRACT

Methods, systems, and devices for wireless communications are described. A first user equipment (UE) may determine its position by receiving locations from one or more other UEs capable of network-based positioning. For example, a second UE may determine its location using network-based positioning and may transmit its location information to the first UE. The first UE may determine its location based on the received location information (e.g., by calculating a weighted average of different locations, by setting its location to be the same as the received location). In some cases, the first UE may receive location information from other UEs during or after a discovery process with other UEs. In some other cases, the first UE may receive messages (e.g., periodic safety messages) from the other UEs, and the messages may each include location information of the respective other UEs.

28 Claims, 13 Drawing Sheets

(56) References Cited

U.S. PATENT DOCUMENTS

| | | | |
|---|---|---|---|
| 2022/0321293 A1* | 10/2022 | Ren | H04W 72/20 |
| 2022/0346056 A1* | 10/2022 | Ko | H04W 4/40 |
| 2022/0408477 A1* | 12/2022 | Sartori | H04W 72/23 |
| 2023/0118170 A1* | 4/2023 | Dong | H04W 4/023 |
| | | | 455/456.1 |

* cited by examiner

NETWORK-ASSISTED POSITIONING FOR SIDELINK COMMUNICATIONS

FIELD OF TECHNOLOGY

The following relates to wireless communications, including network-assisted positioning for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, respective positions of UEs and other devices in a wireless communications system may be used to ensure safe and efficient operation of the UEs within the system. Some positioning procedures, however, may be unavailable to one or more UEs in the system. In other cases, positioning procedures that are available to a UE may, in some scenarios, provide inaccurate positioning.

SUMMARY

The described techniques relate to improved techniques, devices, and apparatuses that support network-assisted positioning for sidelink communications. Generally, the described techniques provide for a user equipment (UE) (e.g., a vehicle UE) to obtain positioning information from one or more other UEs, where another UE may provide its location information based on its ability to perform one or more types of positioning procedures (e.g., network-based positioning procedures). As an example, a first UE may be incapable of network-based positioning procedures (e.g., based on relatively limited capabilities of the first UE). Additionally or alternatively, one or more positioning procedures available to the first UE may be relatively inaccurate (e.g., based on quality of service (QoS) parameters associated with safe operation of the first UE in one or more applications). As a result, the first UE may determine its position (e.g., location) by receiving location information from another other UEs capable of obtaining their position with relatively higher accuracy (e.g., using network-based positioning). In particular, a second UE capable of network-based positioning may determine its location using the network-based positioning procedures (e.g., using a Uu interface), and the second UE may transmit its location information to the first UE. The first UE may then determine its own location using the received location information (e.g., perform a weighted average calculation for multiple locations, set its location to be the received location). In some cases, the first UE may receive location information from other UEs during or after a discovery process with other UEs (e.g., using a PC5 discovery protocol). In some other cases, the first UE may receive messages (e.g., periodic safety messages) from the other UEs, and the messages may each include location information of the respective other UEs. By obtaining the location information of the one or more other UEs, the first UE may enhance its ability for determining a relatively accurate position, thereby enabling safe and efficient operation of the first UE.

A method for wireless communication at a first UE is described. The method may include receiving, from a second UE via a sidelink communication link, a message including location information associated with the second UE, where the message is received based on the second UE supporting one or more positioning procedures that include at least a network-based positioning procedure and determining a location of the first UE based on the location information associated with the second UE.

An apparatus for wireless communication at a first UE is described. The apparatus may include a processor, memory coupled with the processor, and instructions stored in the memory. The instructions may be executable by the processor to cause the apparatus to receive, from a second UE via a sidelink communication link, a message including location information associated with the second UE, where the message is received based on the second UE supporting one or more positioning procedures that include at least a network-based positioning procedure and determine a location of the first UE based on the location information associated with the second UE.

Another apparatus for wireless communication at a first UE is described. The apparatus may include means for receiving, from a second UE via a sidelink communication link, a message including location information associated with the second UE, where the message is received based on the second UE supporting one or more positioning procedures that include at least a network-based positioning procedure and means for determining a location of the first UE based on the location information associated with the second UE.

A non-transitory computer-readable medium storing code for wireless communication at a first UE is described. The code may include instructions executable by a processor to receive, from a second UE via a sidelink communication link, a message including location information associated with the second UE, where the message is received based on the second UE supporting one or more positioning procedures that include at least a network-based positioning procedure and determine a location of the first UE based on the location information associated with the second UE.

Some examples of the method, apparatuses, and non-transitory computer-readable medium described herein may further include operations, features, means, or instructions for broadcasting one or more discovery messages and receiving a discovery response message from the second UE based on the one or more discovery messages, where receiving the message including the location information may be based on receiving the discovery response message from the second UE.

Some examples of the method, apparatuses, and non-transitory computer-readable medium described herein may further include operations, features, means, or instructions for transmitting, to the second UE, a second message including a request for the location information based on receiving the discovery response message, where receiving the message including the location information associated with the second UE may be in response to the second message.

Some examples of the method, apparatuses, and non-transitory computer-readable medium described herein may further include operations, features, means, or instructions for determining one or more positioning QoS parameters for the first UE and transmitting, within the second message, an indication of the one or more positioning QoS parameters, where receiving the message may be based on the one or more positioning QoS parameters.

In some examples of the method, apparatuses, and non-transitory computer-readable medium described herein, each discovery message of the one or more discovery messages includes a request for location information from one or more UEs that support the one or more positioning procedures including at least the network-based positioning procedure.

In some examples of the method, apparatuses, and non-transitory computer-readable medium described herein, the discovery response message includes the message including the location information associated with the second UE.

Some examples of the method, apparatuses, and non-transitory computer-readable medium described herein may further include operations, features, means, or instructions for determining one or more positioning QoS parameters for the first UE and transmitting, within each discovery message of the one or more discovery messages, an indication of the one or more positioning QoS parameters, where receiving the discovery response message may be based on the one or more positioning QoS parameters.

In some examples of the method, apparatuses, and non-transitory computer-readable medium described herein, the one or more positioning QoS parameters includes a positioning accuracy parameter, a latency parameter, or any combination thereof.

Some examples of the method, apparatuses, and non-transitory computer-readable medium described herein may further include operations, features, means, or instructions for determining that the second UE supports the one or more positioning procedures including at least the network-based positioning procedure based on receiving the discovery response message.

In some examples of the method, apparatuses, and non-transitory computer-readable medium described herein, determining the location of the first UE may include operations, features, means, or instructions for determining location information associated with the first UE based on a satellite-based positioning procedure performed by the first UE and determining the location of the first UE based on the location information associated with the first UE and the location information associated with the second UE.

In some examples of the method, apparatuses, and non-transitory computer-readable medium described herein, the satellite-based positioning procedure includes global navigation satellite system (GNSS) positioning.

In some examples of the method, apparatuses, and non-transitory computer-readable medium described herein, determining the location of the first UE may include operations, features, means, or instructions for determining a location of the second UE based on the location information associated with the second UE and setting the location of the first UE as the location of the second UE.

In some examples of the method, apparatuses, and non-transitory computer-readable medium described herein, determining the location of the first UE may include operations, features, means, or instructions for calculating a weighted average location based on the location information of the second UE and setting the location of the first UE as the weighted average location.

Some examples of the method, apparatuses, and non-transitory computer-readable medium described herein may further include operations, features, means, or instructions for determining that one or more sidelink positioning procedures performed by the first UE fail to satisfy a QoS threshold, where receiving the message including the location information associated with the second UE may be based on the one or more sidelink positioning procedures performed by the first UE failing to satisfy the QoS threshold.

In some examples of the method, apparatuses, and non-transitory computer-readable medium described herein, the message including the location information includes a periodic safety message transmitted by the second UE.

In some examples of the method, apparatuses, and non-transitory computer-readable medium described herein, the second UE may be approximately co-located with the first UE.

A method for wireless communication at a first UE is described. The method may include determining a location of the first UE based on one or more positioning procedures supported by the first UE, the one or more positioning procedures including at least a network-based positioning procedure and transmitting, to a second UE via a sidelink communication link, a message including location information associated with the first UE, the location information including the location of the first UE.

An apparatus for wireless communication at a first UE is described. The apparatus may include a processor, memory coupled with the processor, and instructions stored in the memory. The instructions may be executable by the processor to cause the apparatus to determine a location of the first UE based on one or more positioning procedures supported by the first UE, the one or more positioning procedures including at least a network-based positioning procedure and transmit, to a second UE via a sidelink communication link, a message including location information associated with the first UE, the location information including the location of the first UE.

Another apparatus for wireless communication at a first UE is described. The apparatus may include means for determining a location of the first UE based on one or more positioning procedures supported by the first UE, the one or more positioning procedures including at least a network-based positioning procedure and means for transmitting, to a second UE via a sidelink communication link, a message including location information associated with the first UE, the location information including the location of the first UE.

A non-transitory computer-readable medium storing code for wireless communication at a first UE is described. The code may include instructions executable by a processor to determine a location of the first UE based on one or more positioning procedures supported by the first UE, the one or more positioning procedures including at least a network-based positioning procedure and transmit, to a second UE via a sidelink communication link, a message including location information associated with the first UE, the location information including the location of the first UE.

Some examples of the method, apparatuses, and non-transitory computer-readable medium described herein may further include operations, features, means, or instructions for transmitting a location sharing request to a base station and receiving, from the base station, a second message indicating that the first UE may be to share the location of the first UE based on the location sharing request, where transmitting the message to the second UE may be based on receiving the second message.

Some examples of the method, apparatuses, and non-transitory computer-readable medium described herein may further include operations, features, means, or instructions for receiving one or more discovery messages on the sidelink communication link from the second UE and transmitting a discovery response message to the second UE based on the one or more discovery messages, where transmitting the message including the location information may be based on transmitting the discovery response message from the second UE.

Some examples of the method, apparatuses, and non-transitory computer-readable medium described herein may further include operations, features, means, or instructions for receiving, from the second UE, a third message including a request for the location information in response to the discovery response message, where transmitting the message including the location information associated with the first UE may be based on receiving the third message.

Some examples of the method, apparatuses, and non-transitory computer-readable medium described herein may further include operations, features, means, or instructions for receiving, within the third message, an indication of one or more positioning QoS parameters and determining that positioning information obtained from the one or more positioning procedures supported by the first UE satisfy the one or more positioning QoS parameters, where transmitting the message may be based on the one or more positioning QoS parameters.

In some examples of the method, apparatuses, and non-transitory computer-readable medium described herein, each discovery message of the one or more discovery messages includes a request for location information from one or more UEs that support the one or more positioning procedures including at least the network-based positioning procedure.

In some examples of the method, apparatuses, and non-transitory computer-readable medium described herein, the discovery response message includes the message including the location information associated with the first UE.

Some examples of the method, apparatuses, and non-transitory computer-readable medium described herein may further include operations, features, means, or instructions for receiving, within each discovery message of the one or more discovery messages, an indication of one or more positioning QoS parameters and determining that positioning information obtained from the one or more positioning procedures supported by the first UE satisfy the one or more positioning QoS parameters, where transmitting the discovery response message may be based on the one or more positioning QoS parameters.

In some examples of the method, apparatuses, and non-transitory computer-readable medium described herein, the one or more positioning QoS parameters include a positioning accuracy QoS parameter, a latency QoS parameter, or any combination thereof.

In some examples of the method, apparatuses, and non-transitory computer-readable medium described herein, transmitting the message including the location information associated with the first UE may include operations, features, means, or instructions for periodically transmitting the message to one or more UEs.

In some examples of the method, apparatuses, and non-transitory computer-readable medium described herein, the message includes a safety message.

In some examples of the method, apparatuses, and non-transitory computer-readable medium described herein, the first UE may be approximately co-located with the second UE.

DETAILED DESCRIPTION

Figure 1:
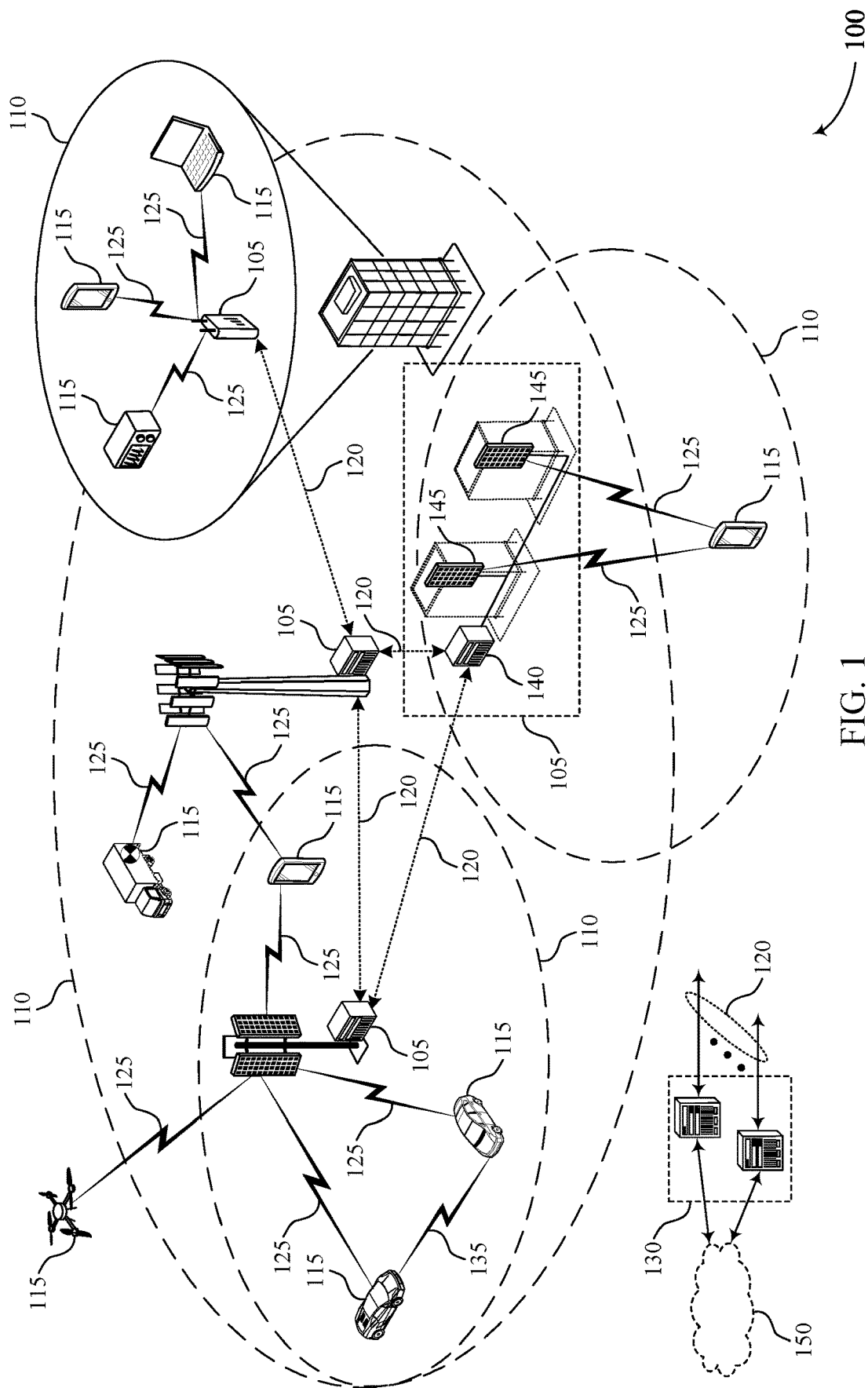
FIGS. 1 and 2 illustrate examples of wireless communications systems that support network-assisted positioning for sidelink communications in accordance with aspects of the present disclosure.

Some wireless communication systems, such as fifth generation (5G) New Radio (NR) systems, may support wireless devices establishing an access link (e.g., a Uu interface) or a sidelink (e.g., a PC5 interface), or both. For example, a user equipment (UE) may establish an access link with a base station and a sidelink (e.g., a sidelink communication link) with another UE. In some cases, a UE may establish an access link with a base station and may establish a sidelink with another UE which may operate as a relay (e.g., which has an access link with the same or different base station as the UE) such that the UE may communicate with a network via the access link or the sidelink, or both. In other cases, a UE may only support sidelink communications and may not have capabilities to communicate directly with the network (e.g., via the Uu interface). Sidelink communications may be referred to as vehicle-to-vehicle (V2V) communications, vehicle-to-everything (V2X) communications, device-to-device (D2D) communications, or other terminology.

A UE may use positioning procedures for determining its location (e.g., position) as well as locations of other, nearby devices. For instance, a UE, which may be an example of a vehicle (e.g., a V2X-capable UE), may determine its location using various positioning schemes, procedures, methods, or the like. The location of the UE and other devices may be used in various applications and scenarios, particularly those related to safety. As one example, the UE (e.g., a vehicle) may determine the location of one or more other nearby vehicles and/or pedestrians (e.g., carrying personal UEs) to ensure that the UE may safely operate. In some cases, the UE may determine its location using network-based positioning procedures that include the exchange of signaling with a base station (e.g., measuring positioning reference signals (PRSs) from the network, receiving other signaling from the network). Additionally or alternatively, the UE may use sidelink positioning procedures to determine its location (e.g., the UE may communicate with other UEs using sidelink communication links to obtain positioning information). Additionally or alternatively, a UE may determine its location using satellite-based positioning procedures (e.g., global navigation satellite system (GNSS) positioning), where the UE may communicate with a satellite to obtain positioning information. In any case, the UE may rely on relatively accurate positioning (e.g., within some threshold) to meet safety requirements associated with the operation of the UE (e.g., to avoid collisions with other vehicles, pedestrians, buildings), among other applications.

In some cases, however, some positioning procedures may be unavailable or inaccurate. For example, a first UE may only be sidelink capable and may thus not support network-based positioning procedures (e.g., the first UE may not support direct communications with the network). As such, the first UE may be unable to determine its position using a network interface (e.g., the Uu interface). Additionally or alternatively, the first UE may be unable to determine its location accurately (e.g., the location accuracy may not satisfy one or more positioning quality of service (QoS) parameters (e.g., requirements)) due to the positioning procedure used by the first UE, the environment the UE is located in, or any combination thereof. For instance, the first UE may be located in a relatively large city, and GNSS communications (e.g., for positioning) may be unavailable, unreliable, or may not provide a position to the first UE that satisfies the one or more positioning QoS parameters. In other examples, sidelink positioning may not be available (e.g., deployed) to the UE or may be relatively inaccurate (e.g., due to relatively few other devices to perform sidelink positioning with). Thus, if the UE is unable to determine its location accurately, some position-reliant operations of the UE that rely on the UE's position may not be able to meet safety requirements, thereby potentially creating safety issues.

As described herein, the first UE may obtain positioning assistance from other nearby UEs that may be capable of using at least network-based positioning procedures, which may enhance the ability of the first UE to accurately determine its position. As an example, the first UE (e.g., a vehicle, a V2X UE) may receive location information from one or more other UEs (e.g., UEs carried by pedestrians, other UEs, other vehicles) in the vicinity to determine the location of the first UE. To determine its location (e.g., a particular geographic location, some coordinates, a position relative to other devices or objects, or the like), the first UE may receive location information of other UEs (e.g., cellular UEs (C-UEs), pedestrian UEs (P-UEs)) from the other UEs, where the other UEs may be capable of using the network interface to determine their own respective locations. That is, the other UEs may determine their respective locations using the network interface with some degree of accuracy, and one or more of the other UEs may each transmit a message to the first UE indicating the respective location information. The first UE may determine its location using the received message(s). For example, the first UE may set its location to be a location of another UE (e.g., both UEs may be approximately co-located, as the other UE may be a driver's cell phone located within the vehicle (e.g., the first UE)), or the first UE may average locations of multiple UEs, or the like. By receiving positions of other network-interfacing UEs, the first UE may accurately determine its location without network-based positioning procedures, GNSS positioning procedures, or the like.

Aspects of the disclosure are initially described in the context of wireless communications systems. Aspects of the disclosure are further illustrated by and described with reference to process flows, apparatus diagrams, system diagrams, and flowcharts that relate to network-assisted positioning for sidelink communications.

FIG. 1 illustrates an example of a wireless communications system 100 that supports network-assisted positioning for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink (UL) component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination thereof. A vehicle may signal information related to traffic conditions, signal scheduling, weather, safety, emergencies, or any other information relevant to a V2X system. In some examples, vehicles in a V2X system may communicate with roadside infrastructure, such as roadside units (RSUs), or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed (e.g., shared) and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, UL transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support techniques for a UE 115 (e.g., a vehicle UE 115, a UE 115 that supports V2X, a UE 115 that supports at least sidelink communications) to obtain positioning assistance from other nearby UEs 115 that may be capable of using at least network-based positioning procedures. For example, a first UE 115 may determine its position (e.g., location) by receiving location information from other UEs 115 that may be capable of at least network-based positioning. In such cases, a second UE 115 that is capable of network-based positioning may determine its location using network-based positioning (e.g., using a Uu interface) (e.g., by communicating with a base station 105). Here, the second UE 115 may measure one or more PRSs from a base station 105 and determine the location of the second UE 115. In some other examples, the second UE 115 may measure one or more PRSs from a base station 105 and report the measurements to the base station 105 for the base station 105 to determine the location of the second UE 115, and the base station 105 may transmit the location of the second UE 115 to the second UE 115. In some other examples, the second UE 115 may request its location from the base station 105 and/or may request to share the location of the second UE 115.

Upon determining its location, the second UE 115 may transmit location information (e.g., an indication of the location of the second UE 115) to the first UE 115 (e.g., which may not be capable of network-based positioning). The first UE 115 may then determine its location using the received location information. For example, the first UE 115 may calculate a weighted average of different UE locations (e.g., using a location of the first UE 115 and location(s) of one or more other UEs 115, using the locations of two or more other UEs 115, or the like). In other examples, the first UE 115 may set its location to be the location received from the second UE 115. In some cases, the first UE 115 may receive location information from other UEs 115 during or after a discovery process (e.g., using a PC5 discovery protocol). In some other cases, the first UE 115 may receive messages (e.g., periodic safety messages) from the other UEs 115, and the messages may each include location information of the respective other UEs 115.

Figure 2:
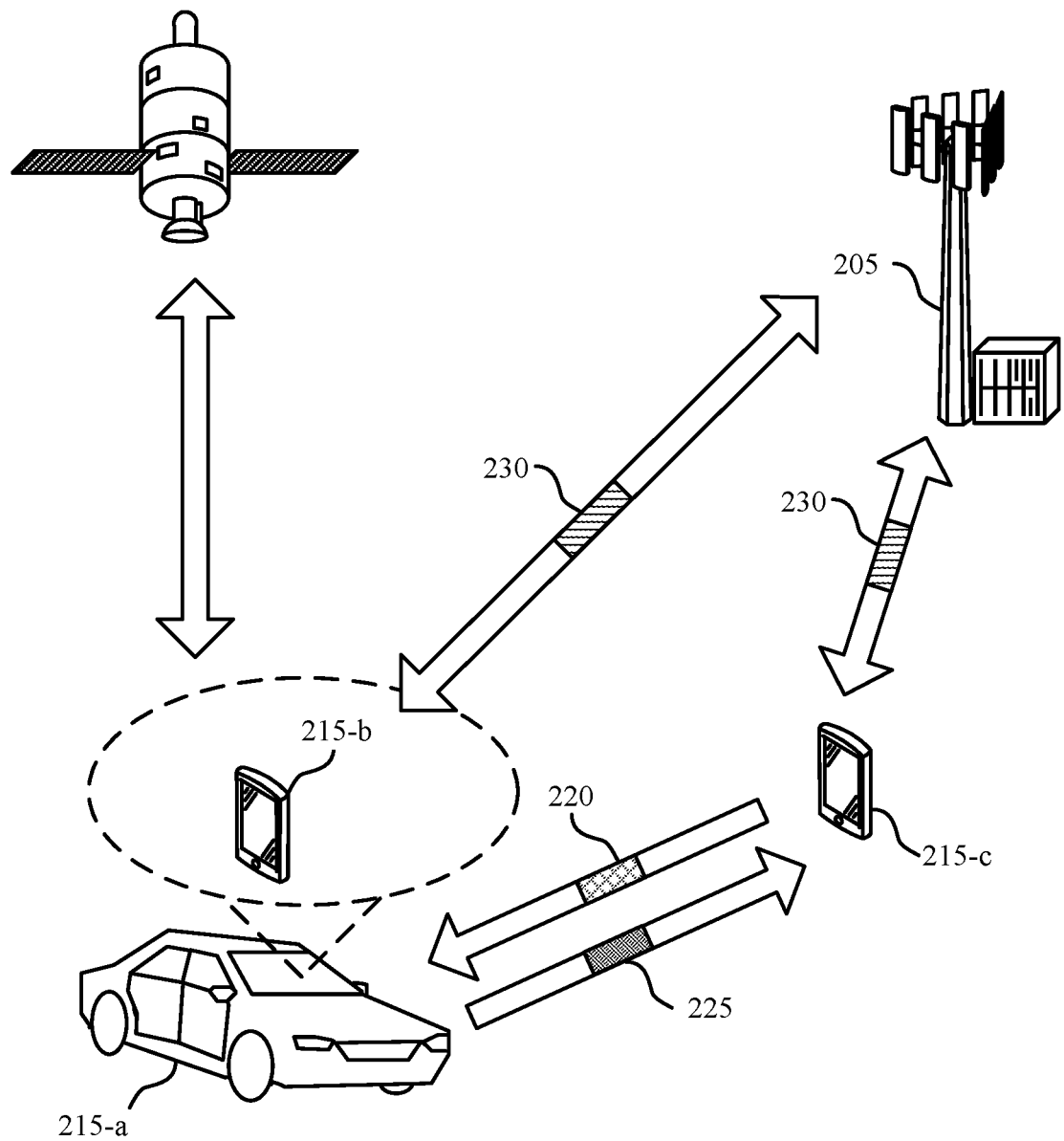

FIG. 2 illustrates an example of a wireless communications system 200 that supports network-assisted positioning for sidelink communications in accordance with aspects of the present disclosure. The wireless communications system 200 may implement or be implemented by aspects of the wireless communications system 100 as described with reference to FIG. 1. For example, the wireless communications system 200 may include base station 205 and UEs 215, which may be examples of a base station 105 and UEs 115, or any other devices, as described herein. The wireless communications system 200 may support improvements to interference, processing, power consumption, and more efficient utilization of communication resources, among other benefits. Although FIG. 2 illustrates UE 215-a communicating with UE 215-c, it may be understood that UE 215-a may communicate similarly with UE 215-b. Further, although FIG. 2 illustrates UE 215-c communicating with base station 205, it may be understood that UE 215-b may communicate similarly with base station 205. In some examples, satellite 210 may communicate with UE 215-a, UE 215-b, UE 215-c, or any combination thereof.

The wireless communications system 200 may support various types of UEs 215 (e.g., UE 215-a), which may have different capabilities and hardware configurations. For example, UE 215-a may have both sidelink and network (e.g., Uu) communication capabilities. In such cases, UE 215-a may communicate with other UEs 215 via sidelink communication links and may communicate with a network (e.g., via base station 205) over a network interface (e.g., Uu). In some examples, UE 215-a may communicate with both sidelink and an access link with the base station 205, for example, using a single modem. UE 215-a may communicate over a sidelink communication link based on (e.g., using) Mode 1 or Mode 2 sidelink operation.

In some examples, UE 215-a may be integrated or co-located with a network-interfacing (e.g., Uu capable) UE 215. For example, a vehicle may include multiple (e.g., two) modems, where one modem may be for communications with the network via base station 205 and another modem may be for sidelink communications with other UEs 215 (e.g., UE 215-c). In such cases, UE 215-a may be capable of communicating using V2X communication schemes while also supporting a network-interface (e.g., for telematics-related application in a vehicle such as UE 215-a). UE 215-a may accordingly be capable of communicating over sidelink communication links based on (e.g., using) Mode 2 operation. In this way, a vehicle may be capable of both sidelink and network-based (e.g., Uu) communications.

In some other examples, UE 215-a may be sidelink capable (e.g., only sidelink capable). That is, UE 215-a may only be able to communicate with other vehicle UEs, pedestrian UEs, cellular UEs, or the like, over sidelink communication links. In such examples, UE 215-a may communicate based on (e.g., using) UE pre-configured schemes and Mode 2 operation. In such cases, the vehicle may include a single modem that may be capable of communicating using V2X communication schemes (e.g., only V2X communication schemes).

The wireless communications system 200 may support a number of positioning methods to determine a UE's location. For example, wireless communications system 200 may support observed time difference of arrival (OTDOA) positioning, assisted GNSS (A-GNSS) positioning, enhanced cell ID (E-CID) positioning, sensor-based positioning, wireless local area network (WLAN)-based positioning, Bluetooth-based positioning, NR uplink positioning, NR E-CID positioning, NR downlink time difference of arrival (DL-TDoA) positioning, NR downlink angle of departure (DL-AoD) positioning, NR multi-cell round trip time (multi-RTT) positioning, or any combination thereof, among other positioning methods. As an example, wireless communications system 200 may support GNSS positioning, and UE 215-a (e.g., a V2X UE), UE 215-b (e.g., a C-UE, which may be approximately co-located with UE 215-a), UE 215-c (e.g., a C-UE, a P-UE), or any combination thereof, may communicate with satellite 210.

Satellite 210 may support GNSS for providing location information to multiple devices. In particular, satellite 210 may transmit signals that include positioning and timing information to various receiving devices (e.g., including UE 215-a, UE 215-b, UE 215-c), which may be used to determine respective locations of the devices. The satellite 210 may accordingly be an example of a satellite that is a part of various satellite-based positioning systems (e.g., Global Positioning System (GPS), Galileo, Global'naya Navigatsionnaya Sputnikovaya Sistema (GLONASS), BeiDou Navigation Satellite System). In some cases, the satellite 210 may also include functionality of regional satellite-based augmentation systems, among other functions that support improved positioning.

Wireless communications system 200 may support sidelink positioning procedures, which may include the exchange of PRSs between devices. In some cases, sidelink positioning may be beneficial when a GNSS signal is not available (e.g., in sheltered locations) or has a poor signal quality (e.g., signaling may be reflected off of buildings in dense urban environments). In some other cases, sidelink positioning may be beneficial for relatively high-accuracy ranging scenarios (e.g., for determining an accurate distance between two vehicles). As such, UEs 215 may support sidelink-based high-accuracy positioning procedures for V2X, public safety, and commercial scenarios. Some sidelink positioning procedures may support relative positioning (e.g., ranging) (e.g., determining a distance between two UEs 215), absolute positioning (e.g., determining geo-coordinates of a UE 215), or both. A relative position may be a position or distance of a UE 215 with respect to another UE 215, and an absolute position may be a position with respect to an absolute position of a reference UE. As an example, a UE 215 (e.g., a vehicle UE, such as UE 215-a) may use positioning to determine a location of a vehicle UE, a pedestrian UE, RSU, or the like. A UE 215 may perform a sidelink positioning procedure by measuring a received positioning reference signal (PRS) transmitted over a sidelink communication link and, in some cases, may also transmit a PRS to other UEs. For example, the UE 215 may measure parameters such as time of arrival (ToA), time difference of arrival (TDoA), angle of arrival (AoA), round trip time (RTT), or any combination thereof, among other parameters, of a received sidelink PRS. In some cases, positioning accuracy for sidelink positioning may be based on a bandwidth of the sidelink PRS.

In some examples, UE 215-a may be unable to determine its location using some positioning procedures. For example, UE 215-a may only be sidelink capable, and the UE 215-a may therefore be unable to perform network-based positioning procedures. In addition, sidelink positioning procedures may not be deployed or supported by UE 215-a, and GNSS positioning may not be available or reliable enough for UE 215-a to determine its location (e.g., with some threshold level of accuracy). In some other examples, neither GNSS positioning nor sidelink positioning may provide UE 215-a with location information with sufficient accuracy to meet one or more V2X UE positioning QoS parameters (e.g., QoS requirements). In any case, unavailable, unreliable, or inaccurate positioning for UE 215-a may negatively affect location-dependent V2X applications.

The techniques described herein may enable UE 215-a to acquire network-assisted (e.g., Uu-assisted) positioning information from other UEs to accurately determine its own location. For example, UE 215-b, UE 215-c, or both, may be capable of network-based (e.g., using a Uu interface) positioning to determine their own respective locations, and UE 215-a may receive the respective locations of UE 215-b, UE 215-c, or both, via sidelink communication links. In this way, UE 215-a may determine its location by using the network-based positioning capabilities of other UEs 215, which may be generally referred to as network-assisted positioning. In some examples, UE 215-a may support GNSS positioning, sidelink positioning, or both, and UE 215-a may use such positioning procedures in combination with network-based positioning assistance from the other UEs to determine an accurate location. In some cases, UE 215-b may be a C-UE and may be carried by a driver or a passenger located in the vehicle corresponding to UE 215-a. As such, both UE 215-a and UE 215-b may be approximately co-located. In some cases, UE 215-c may be a P-UE and may be a mobile phone carried by a pedestrian nearby (e.g., in relatively close proximity to, located some threshold distance away from) UE 215-a, which may be capable of V2X communications with UE 215-a.

Using network-assisted the positioning procedures described herein may result in one or more benefits. For example, in dense urban environments, GNSS positioning procedures may not perform well due to GNSS signal blockage, reflection, or both. However, dense, small-cell deployment may be available in such urban environments and thus accurate network-based (e.g., using a Uu interface) positioning may be available. Further, as C-UEs (e.g., cell phones) are broadly available, especially in urban environments (e.g., each driver of a V-UE may have a phone), network-assisted V2X positioning may be a practical complementary or standalone positioning solution for GNSS positioning or sidelink positioning based V2X location services.

In some cases, UE 215-*a* (e.g., a vehicle UE (V-UE)) may receive location information 220 from UE 215-*b* or UE 215-*c* (e.g., C-UEs, P-UEs) during or after a discovery procedure. For example, UE 215-*a* and UE 215-*b* or UE 215-*c* may discover each other via a PC5 discovery protocol. UE 215-*a* may determine that UE 215-*b* or UE 215-*c*, or both, are network-interfacing (e.g., Uu capable) device capable of network-based positioning.

In some examples, UE 215-*a* transmit a request for location information 225 to UE 215-*b* or UE 215-*c*, where UE 215-*b* or UE 215-*c* may determine their own respective locations by performing a network-based positioning procedure, and UE 215-*b* or UE 215-*c* may transmit location information 220 to UE 215-*a*, indicating respective locations of UE 215-*b*, UE 215-*c*, or both, in response to the request for location information 225. UE 215-*a* may then determine its location based on the location of UE 215-*b* or UE 215-*c*. In some other cases, UE 215-*a* may receive sidelink messages transmitted from UE 215-*b* or UE 215-*c* that may include location information of UE 215-*b* or UE 215-*c*, respectively. For example, UE 215-*c* (e.g., a P-UE, such as a smartphone) may send one or more safety messages (e.g., periodically) via one or more sidelink communication links. UE 215-*c* may determine its location via network-based (e.g., using a Uu interface) positioning and may include its location in the one or more safety messages to UE 215-*a*. UE 215-*a* may then determine its location based on the received location from UE 215-*c*. In either case, UE 215-*a* may communicate with one or more (e.g., any number) of UEs 215 (e.g., any number of C-UEs, P-UEs) and may receive one or more locations from respective UEs 215 (e.g., via location information 220). UE 215-*a* may determine its location based on the aggregate of such locations.

In some cases, UE 215-*a* may determine whether it should receive one or more locations from other UEs 215 to accurately determine the location of UE 215-*a*. For example, UE 215-*a* may determine that one or more positioning procedures (e.g., sidelink positioning, GNSS positioning, or any other positioning procedure) are not available, not deployed at UE 215-*a*, or fail to satisfy one or more QoS thresholds (e.g., not reliable). For example, a GNSS signal may be relatively weak or may be not available (e.g., in cases where UE 215-*a* may be located in a tunnel, parked underground, or the like). In some other examples, a quality of the GNSS signal may be relatively reduced based on a current map location or geography, such as if UE 215-*a* is located in an area where the GNSS signal may be reflected or scattered (e.g., an urban area). UE 215-*a* may additionally or alternatively determine whether it needs such locations from other UEs 215 based on positioning QoS parameters (e.g., requirements) of UE 215-*a* (e.g., if current positioning using sidelink positioning, GNSS positioning, or the like does not satisfy one or more QoS parameters (e.g., thresholds, requirements)), then UE 215-*a* may use network-assisted positioning. For example, some applications may be associated with relatively low positioning accuracy parameters (e.g., requirements) compared to other applications. Thus, inaccurate GNSS positioning procedures (e.g., in urban environments) may satisfy such QoS parameters or requirements without network-based (e.g., using a Uu interface) positioning assistance. Some other applications, however, may be associated with relatively high positioning accuracy parameters (e.g., requirements), and thus UE 215-*a* may use network-based (e.g., using a Uu interface) positioning assistance in such cases.

UE 215-*a* may discover (e.g., using PC5 discovery) one or more other UEs 215 (e.g., UE 215-*b*, UE 215-*c*, or both) and may receive location information 220 from the other UEs during, or after, the discovery procedure. To initiate the discovery procedure, UE 215-*a* may transmit a discovery message (e.g., a PC5 discovery message). For example, UE 215-*a* may initiate a Model A discovery, where UE 215-*a* may transmit one or more discovery messages indicating the presence of UE 215-*a* (e.g., indicating "I am here"). In some other examples, UE 215-*a* may initiate a Model B discovery, where UE 215-*a* may transmit a discovery query to determine if there are other UEs 215 present or nearby (e.g., indicating "Who is there?"). In either case, UE 215-*a* may include a request for positioning assistance from a receiving UE 215 (e.g., UE 215-*b*, UE 215-*c*) in the discovery message (s). That is, the discovery message may indicate an intention of a PC5 discovery as well as a request for assistance with positioning (e.g., "I am here, who can help in positioning")).

In some examples, UE 215-*a* may include a query in the discovery message for the receiving UE 215 to indicate if the receiving UE 215 is capable of network-based positioning (e.g., using a Uu interface). In some cases, UE 215-*a* may indicate its positioning QoS parameters (e.g., requirements) in the discovery message or the discovery query. The positioning QoS parameters (e.g., requirements) may reflect a positioning accuracy parameter (e.g., requirement), a latency parameter (e.g., requirement), or both, or the like. A receiving UE 215 of the discovery message or the discovery query (e.g., UE 215-*b*, UE 215-*c*) may react (e.g., may transmit or not transmit a discovery response message, or may modify discovery response message) based on an accuracy that UE 215-*b*, UE 215-*c*, or both, may achieve (e.g., based on capability information, based on an assessment of positioning accuracy or latency) using one or more positioning procedures (e.g., the network-based positioning procedure). For example, UE 215-*b* or UE 215-*c* may transmit a discovery response message indicating an ability to provide sufficient positioning accuracy or latency.

In some cases, UE 215-*b*, UE 215-*c*, or both, may transmit a discovery response message (e.g., a PC5 discovery response message) to UE 215-*a* upon receiving a discovery message or a discovery query from UE 215-*a*. In some examples, the discovery response message may include location information 220. For example, UE 215-*c* may transmit a discovery response message upon receiving a discovery message from UE 215-*a*, and the discovery response message may include or add location information 220 of UE 215-*c*. In some examples, the discovery response message may indicate whether the transmitting UE (e.g., UE 215-*b*, UE 215-*c*) is a network-based positioning capable device (e.g., Uu capable).

UE 215-*b*, UE 215-*c*, or both, may transmit respective location information 220 to UE 215-*a* after the discovery procedure (e.g., using the PC5 discovery protocol). For example, after receiving a discovery response message, UE 215-*a* transmit the request for location information 225 to a discovered UE 215 (e.g., UE 215-*b*, UE 215-*c*) that is capable of network-based positioning (e.g., using a Uu interface), or may transmit a query for positioning assistance. The discovered UE 215 (e.g., UE 215-*b*, UE 215-*c*) may then determine its location by performing network-based positioning (e.g., using a Uu interface) and may transmit a sidelink message carrying its location to UE 215-*a* (e.g., location information 220).

In some examples, UE 215-*b*, UE 215-*c*, or both, (e.g., C-UEs, P-UEs, or the like) may determine their respective locations using network-based (e.g., using a Uu interface) positioning procedures and may transmit their respective locations to UE 215-*a*. For example, UE 215-*b*, UE 215-*c*, or both may determine their respective locations based on Uu PRS measurement (e.g., measuring PRS from the base station 205), a location of base station 205 (e.g., a gNB) via base station location information, or both. That is, UE 215-*b*, UE 215-*c*, or both may measure PRSs transmitted from base station 205, may determine the location of base station 205 and may determine own respective locations of UE 215-*b* and UE 215-*c*. UE 215-*b*, UE 215-*c*, or both, may transmit their respective determined locations to UE 215-*a* via the location information 220.

In some other examples, UE 215-*b*, UE 215-*c*, or both may request their respective locations from a network (e.g., via base station 205). For example, for Uu-based positioning, UE 215-*b*, UE 215-*c*, or both may transmit positioning related reference signal transmissions or measure reference signals (e.g., measure one or more PRSs). UE 215-*b*, UE 215-*c*, or both, may transmit their respective measurements to the network (e.g., to base station 205) via a measurement report, and the network (e.g., base station 205, a location management function (LMF), or the like) may determine the respective locations of UE 215-*b*, UE 215-*c*, or both, and base station 205 may transmit such locations to UE 215-*b*, UE 215-*c*, or both, respectively. Additionally or alternatively, the network (e.g., base station 205, the LMF, or the like) may send UE 215-*b*, UE 215-*c*, or both, their respective locations via location information upon receiving request for location information (e.g., from UE 215-*b*, UE 215-*c*, or both, respectively).

Operations of UE 215-*b*, UE 215-*c*, or both, may be transparent to the network (e.g., base station 205). For example, UE 215-*b*, UE 215-*c*, or both, may perform network-based (e.g., using a Uu interface) positioning to determine their respective locations and how UE 215-*b*, UE 215-*c*, or both may use their respective locations (e.g., by transmitting their locations to UE 215-*a*) may be transparent to the network. Additionally or alternatively, UE 215-*b*, UE 215-*c*, or both, may share their respective locations with UE 215-*a* (e.g., or any other device) if (e.g., only if) the network (e.g., base station 205, the LMF, or the like) grants permission. Thus, UE 215-*b*, UE 215-*c*, or both may transmit location sharing request 230 to the network (e.g., base station 205, the LMF, or the like) to be able to share the respective locations of UE 215-*b*, UE 215-*c*, or both. The network may respond with an indication to UE 215-*b*, UE 215-*c*, or both that location sharing is granted (or not) via a location sharing grant.

Upon determining their respective locations using network-based positioning (e.g., using a Uu interface), UE 215-*b*, UE 215-*c*, or both, may transmit their respective one or more locations (e.g., within location information 220) to UE 215-*a*, and UE 215-*a* may determine its location based on the one or more received locations. For example, UE 215-*a* may use a received location from location information 220 as its own location. That is, UE 215-*a* may set its own location to be the same as or approximately the same as a received location from location information 220. In some other examples, UE 215-*a* may determine its location as a weighted average from locations of UE 215-*a*, UE 215-*b*, UE 215-*c*, any other UE 215, or any combination thereof. The weight of each location may be based on (e.g., calculated based on), include, or be a reference signal received power (RSRP) measured from reference signal transmissions (e.g., a discovery response message, separate reference signal transmissions, or the like) from UE 215-*b*, UE 215-*c*, any other UE 215, or any combination thereof. Other methods for UE 215-*a* to determine its location based on one or more received locations may be implementation specific. Upon determining its location, UE 215-*a* may apply its location in various applications (e.g., V2X applications) that may use its location.

In some examples, UE 215-*a* may receive one or more sidelink messages (e.g., safety messages) from UE 215-*b*, UE 215-*c*, or both, and the one or more sidelink messages may include or carry location information 220 for UE 215-*b*, UE 215-*c*, or both, respectively. In such examples, UE 215-*b*, UE 215-*c*, or both, may be pedestrian UEs transmitting the safety messages. UE 215-*b*, UE 215-*c*, or both, may determine their respective locations via network-based (e.g., using a Uu interface) positioning. Upon receiving the location information 220, UE 215-*a* may derive or determine its location based on the received location information 220. For example, UE 215-*a* may determine its location as a weighted average from locations of UE 215-*b*, UE 215-*c*, any other UE 215, or any combination thereof. The weight of each location may be based on (e.g., calculated based on), include, or be an RSRP measured from reference signal transmissions (e.g., the safety messages, separate reference signal transmissions, or the like) from UE 215-*b*, UE 215-*c*, any other UE 215, or any combination thereof. Other methods for UE 215-*a* to determine its location based on one or more received locations may be implementation specific.

Figure 3:
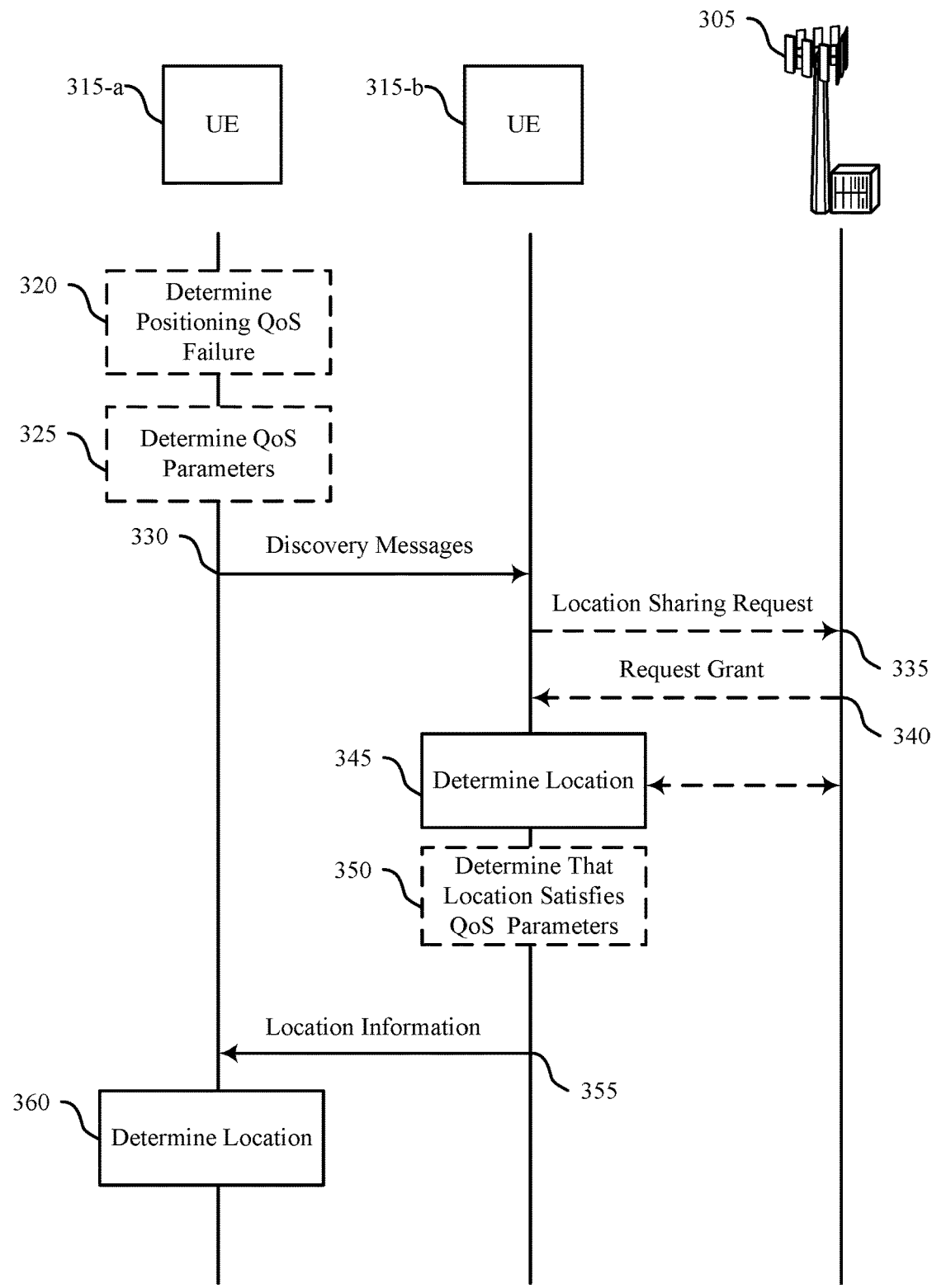
FIGS. 3 and 4 illustrate examples of process flows in a system that support network-assisted positioning for sidelink communications in accordance with aspects of the present disclosure.

FIG. 3 illustrates an example of a process flow 300 in a system that supports network-assisted positioning for sidelink communications in accordance with aspects of the present disclosure. The process flow 300 may implement or be implemented by aspects of the wireless communications system 100, wireless communications system 200, or a combination thereof, as described with reference to FIGS. 1 and 2. In some examples, the process flow 300 may include example operations associated with UE 315-*a*, UE 315-*b*, or base station 305, which may be examples of the corresponding devices described with reference to FIGS. 1 and 2. In the following description of the process flow 300, the operations between UE 315-*a*, UE 315-*b*, and base station 305 may be performed in a different order than the example order shown, or the operations performed by UE 315-*a*, UE 315-*b*, and base station 305 may be performed in different orders or at different times. Some operations may also be omitted from the process flow 300, and other operations may be added to the process flow 300. In some examples, UE 315-*a* may be a V-UE (e.g., a V2X UE), and UE 315-*b* may be a C-UE, P-UE, or both.

At 320, UE 315-*a* may optionally determine that one or more sidelink positioning procedures (e.g., GNSS positioning, sidelink positioning) performed by UE 315-*a* fail to satisfy a QoS threshold (e.g., QoS requirements). Additionally or alternatively, at 325, UE 315-*a* may optionally determine one or more positioning QoS parameters for UE 315-*a*. Such parameters may include positioning QoS thresholds that are associated with one or more applications at the UE 315-*a*.

At 330, UE 315-*a* may broadcast one or more discovery messages (e.g., to UE 315-*b*). In some examples, UE 315-*a* may transmit, within each discovery message of the one or more discovery messages, an indication of the one or more positioning QoS parameters. In some examples, the one or more positioning QoS parameters may include a positioning accuracy parameter, a latency parameter, or any combination thereof. Here, the one or more positioning QoS parameters may be associated with safety thresholds for an application of UE 315-*a* (e.g., for avoiding collisions, avoiding obstacles or other objects, or the like). Each discovery message of the one or more discovery messages may include a request for location information from one or more UEs that support the one or more positioning procedures including at least a network-based positioning procedure. In some examples, UE 315-*b* may be approximately co-located with UE 315-*a*.

At 335, UE 315-*b* may optionally transmit a location sharing request to base station 305. For instance, UE 315-*b* may transmit a request to share its location with UE 315-*a* based on receiving the one or more discovery messages (e.g., including a request for positioning assistance). At 340, UE 315-*b* may receive, from base station 305, a message indicating that UE 315-*b* is to share a location of UE 315-*b* based on the location sharing request.

At 345, UE 315-*b* may determine the location of UE 315-*b* based on one or more positioning procedures supported by UE 315-*b*, the one or more positioning procedures including at least the network-based positioning procedure (e.g., and may additionally or alternatively include GNSS positioning, sidelink positioning, or the like). For example, UE 315-*b* may measure PRSs from base station 305 and transmit a measurement report to base station 305 based on the measured PRSs. As a result, UE 315-*b* may determine its location information based on the PRS measurements and a location of base station 305.

At 350, UE 315-*b* may optionally determine that positioning information obtained from the one or more positioning procedures supported by UE 315-*b* satisfy the one or more positioning QoS parameters. More specifically, based on the positioning QoS parameters indicated by UE 315-*a* and the location information determined by UE 315-*b*, UE 315-*b* may determine that it is able to assist UE 315-*a* with positioning.

At 355, UE 315-*a* may receive, from UE 315-*b* via a sidelink communication link, a message including the location information associated with UE 315-*b*, where the message is received based on UE 315-*b* supporting one or more positioning procedures that include at least the network-based positioning procedure. In some examples, the message including the location information may be a discovery response message. That is, the discovery response message may include the message including the location information associated with UE 315-*b*. In some examples, UE 315-*a* may receive the discovery response message from UE 315-*b* based on the one or more discovery messages, where receiving the message including the location information may be based on receiving the discovery response message from UE 315-*b*. Additionally or alternatively, receiving the discovery response message may be based on the one or more positioning QoS parameters. In some examples, UE 315-*b* may transmit the message including the location information associated with UE 315-*b* to UE 315-*a* based on receiving the message indicating that UE 315-*b* is to share the location of UE 315-*b*.

In some examples, receiving the message including the location information associated with UE 315-*b* may be based on the one or more positioning procedures performed by UE 315-*a* (e.g., GNSS positioning, sidelink positioning) failing to satisfy the QoS threshold. For instance, UE 315-*a* may determine that the location determined via sidelink and/or GNSS positioning may fail to satisfy a threshold QoS, and UE 315-*a* may request (and receive) location from other co-located UEs as a result.

At 360, UE 315-*a* may determine a location of UE 315-*a* based on the location information associated with UE 315-*b*. In some examples, UE 315-*a* may determine location information associated with UE 315-*a* based on a satellite-based positioning procedure performed by UE 315-*a*. In some examples, UE 315-*a* may determine the location of UE 315-*a* based on the location information associated with UE 315-*a* and the location information associated with UE 315-*b*. In some examples, the satellite-based positioning procedure may include GNSS positioning. In some examples, UE 315-*a* may determine the location of UE 315-*b* based on the location information associated with UE 315-*b*. In some examples, UE 315-*a* may set the location of UE 315-*a* as the location of UE 315-*b*. In some examples, UE 315-*a* may calculate a weighted average location based on the location information of UE 315-*b*. In some examples, UE 315-*a* may set the location of UE 315-*a* as the weighted average location.

Figure 4:
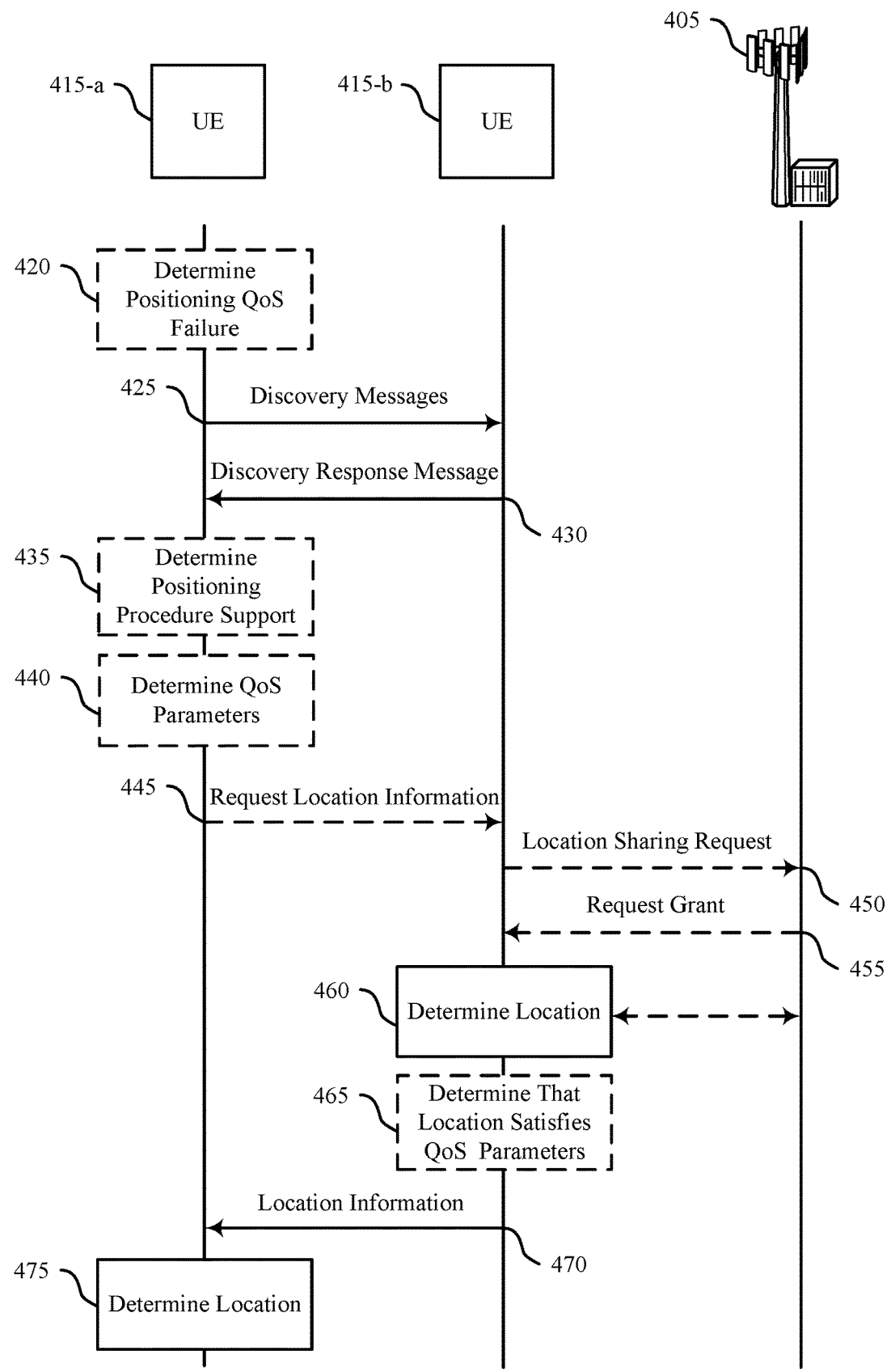

FIG. 4 illustrates an example of a process flow 400 in a system that supports network-assisted positioning for sidelink communications in accordance with aspects of the present disclosure. The process flow 400 may implement or be implemented by aspects of the wireless communications system 100, wireless communications system 200, process flow 300, or a combination thereof, as described with reference to FIGS. 1, 2, and 3. In some examples, the process flow 400 may include example operations associated with UE 415-*a*, UE 415-*b*, or base station 405, which may be examples of the corresponding devices described with reference to FIGS. 1, 2, and 3. In the following description of the process flow 400, the operations between UE 415-*a*, UE 415-*b*, and base station 405 may be performed in a different order than the example order shown, or the operations performed by UE 415-*a*, UE 415-*b*, and base station 405 may be performed in different orders or at different times. Some operations may also be omitted from the process flow 400, and other operations may be added to the process flow 400. In some examples, UE 415-*a* may be a V-UE (e.g., a V2X UE), and UE 415-*b* may be a C-UE, P-UE, or both.

At 420, UE 415-*a* may determine that one or more sidelink positioning procedures (e.g., GNSS positioning, sidelink positioning) performed by UE 415-*a* fail to satisfy a QoS threshold (e.g., QoS requirements).

At 425, UE 415-*a* may broadcast one or more discovery messages (e.g., to UE 415-*b*). In In some examples, each discovery message of the one or more discovery messages may include a request for location information from one or more UEs that support the one or more positioning procedures including at least a network-based positioning procedure. In some examples, UE 415-*b* may be approximately co-located with UE 415-*a*.

At 430, UE 415-*a* may receive a discovery response message from UE 415-*b* based on the one or more discovery messages. In some examples, the discovery procedure may be complete after receiving the discovery response message.

At 435, UE 415-*a* may determine that UE 415-*b* supports the one or more positioning procedures including at least the network-based positioning procedure based on receiving the discovery response message. For example, the discovery response message may indicate that UE 415-*b* supports the one or more positioning procedures including at least the network-based positioning procedure.

At 440, UE 415-a may determine one or more positioning QoS parameters for UE 415-a. In some examples, the one or more positioning QoS parameters may include a positioning accuracy parameter, a latency parameter, or any combination thereof.

At 445, UE 415-a may transmit, to UE 415-b, a second message including a request for the location information based on receiving the discovery response message, where receiving the message including the location information associated with UE 415-b may be in response to the second message. In some examples, UE 415-a may transmit, within the second message, an indication of the one or more positioning QoS parameters.

At 450, UE 415-b may transmit a location sharing request to base station 405. At 455, UE 415-b may receive, from base station 405, a message indicating that UE 415-b is allowed to share a location of UE 415-b based on the location sharing request.

At 460, UE 415-b may determine the location of UE 415-b based on one or more positioning procedures supported by UE 415-b, the one or more positioning procedures including at least the network-based positioning procedure (e.g., and may additionally or alternatively include GNSS positioning, sidelink positioning, or the like). For example, UE 415-b may measure PRSs, transmit a measurement report, transmit a request for location information of UE 415-b, transmit a reference signal transmission, receive base station location information, receive location information, or the like.

At 465, UE 415-b may determine that positioning information obtained from the one or more positioning procedures supported by UE 415-b satisfy the one or more positioning QoS parameters.

At 470, UE 415-a may receiving, from UE 415-b via a sidelink communication link, a message including the location information associated with UE 415-b, where the message may be received based on UE 415-b supporting one or more positioning procedures that include at least the network-based positioning procedure. In some examples, UE 415-a may receive the message including the location information based on receiving the discovery response message from UE 415-b. In some examples, UE 415-a may receive the message based on the one or more positioning QoS parameters. In some examples, UE 415-a may receive the message including the location information associated with UE 415-b based on the one or more sidelink positioning procedures performed by UE 415-a (e.g., GNSS positioning, sidelink positioning) failing to satisfy the QoS threshold. In some examples, the message including the location information may include a periodic safety message transmitted by UE 415-b.

At 475, UE 415-a may determine a location of UE 415-a based on the location information associated with UE 415-b. In some examples, UE 415-a may determine location information associated with UE 415-a based on a satellite-based positioning procedure performed by UE 415-a. In some examples, UE 415-a may determine the location of UE 415-a based on the location information associated with UE 415-a and the location information associated with UE 415-b. In some examples, the satellite-based positioning procedure may include GNSS positioning. In some examples, UE 415-a may determine the location of UE 415-b based on the location information associated with UE 415-b. In some examples, UE 415-a may set the location of UE 415-a as the location of UE 415-b. In some examples, UE 415-a may calculate a weighted average location based on the location information of UE 415-b. In some examples, UE 415-a may set the location of UE 415-a as the weighted average location.

Figure 5:
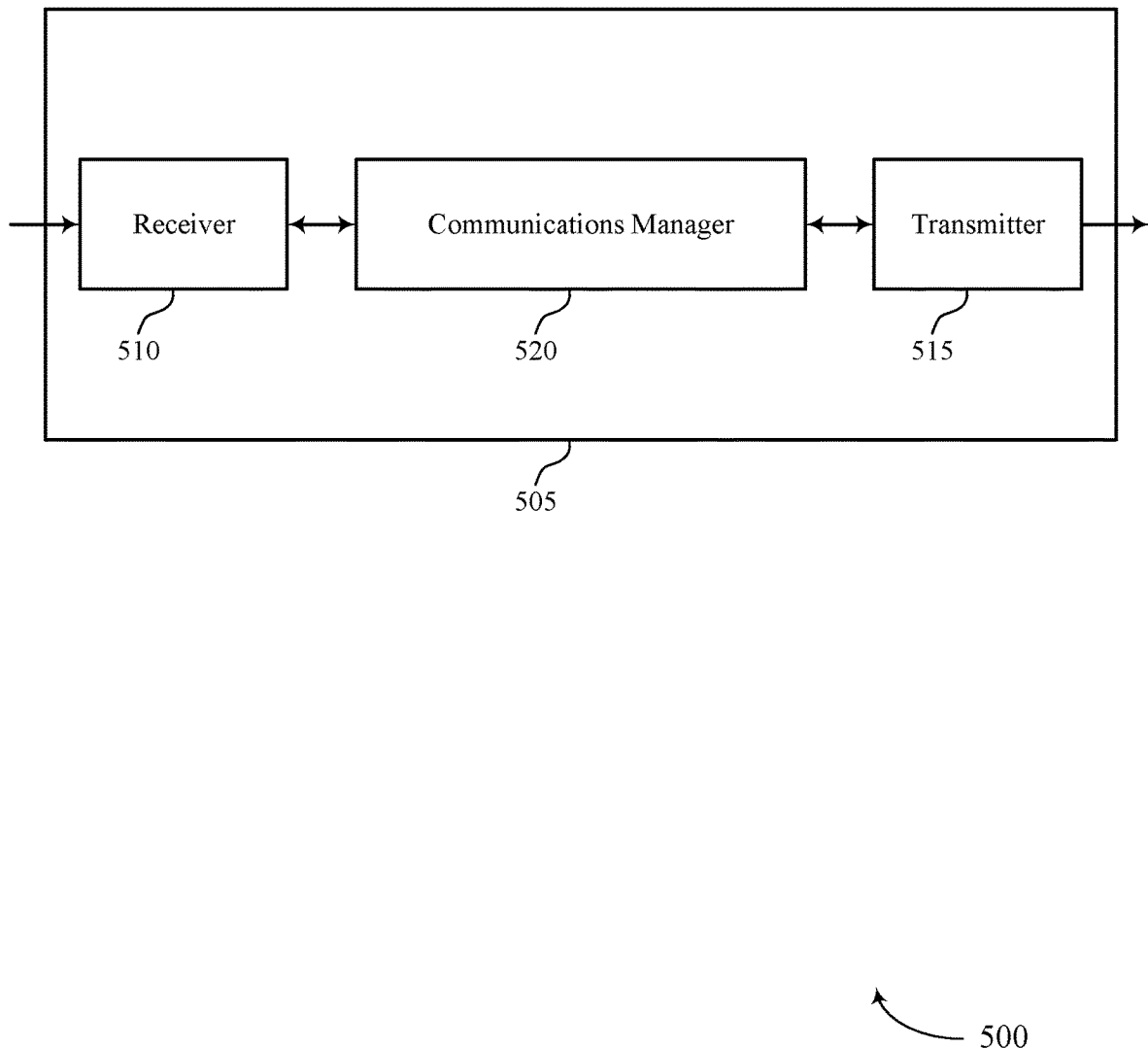
FIGS. 5 and 6 show block diagrams of devices that support network-assisted positioning for sidelink communications in accordance with aspects of the present disclosure.

FIG. 5 shows a block diagram 500 of a device 505 that supports network-assisted positioning for sidelink communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to network-assisted positioning for sidelink communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to network-assisted positioning for sidelink communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of network-assisted positioning for sidelink communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for receiving, from a second UE via a sidelink communication link, a message including location information associated with the second UE, where the message is received based on the second UE supporting one or more positioning procedures that include at least a network-based positioning procedure. The communications manager 520 may be configured as or otherwise support a means for determining a location of the first UE based on the location information associated with the second UE.

Additionally or alternatively, the communications manager 520 may support wireless communication at a first UE in accordance with examples as disclosed herein. For example, the communications manager 520 may be configured as or otherwise support a means for determining a location of the first UE based on one or more positioning procedures supported by the first UE, the one or more positioning procedures including at least a network-based positioning procedure. The communications manager 520 may be configured as or otherwise support a means for transmitting, to a second UE via a sidelink communication link, a message including location information associated with the first UE, the location information including the location of the first UE.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources.

Figure 6:
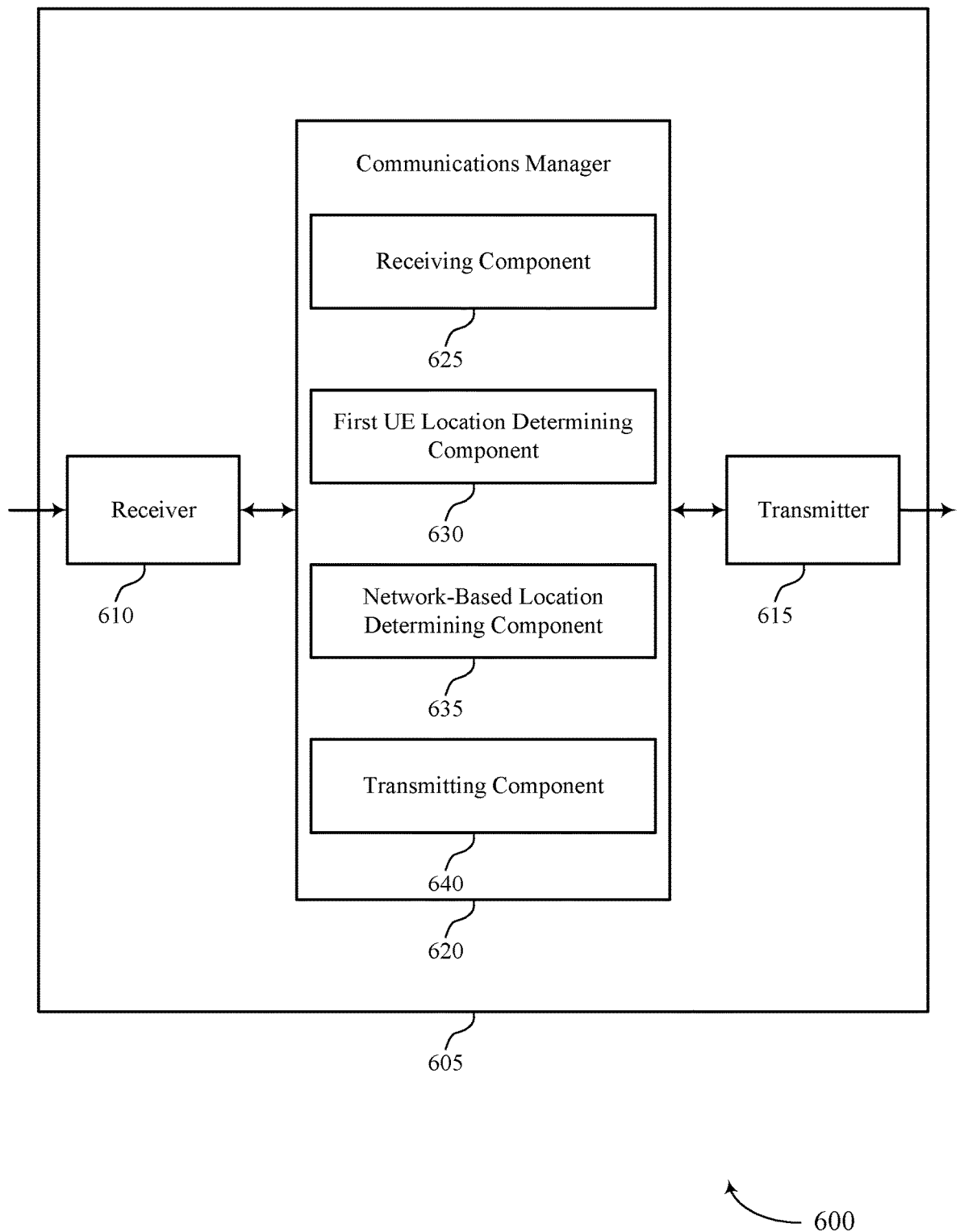

FIG. 6 shows a block diagram 600 of a device 605 that supports network-assisted positioning for sidelink communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to network-assisted positioning for sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to network-assisted positioning for sidelink communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of network-assisted positioning for sidelink communications as described herein. For example, the communications manager 620 may include a receiving component 625, a first UE location determining component 630, a network-based location determining component 635, a transmitting component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The receiving component 625 may be configured as or otherwise support a means for receiving, from a second UE via a sidelink communication link, a message including location information associated with the second UE, where the message is received based on the second UE supporting one or more positioning procedures that include at least a network-based positioning procedure. The first UE location determining component 630 may be configured as or otherwise support a means for determining a location of the first UE based on the location information associated with the second UE.

Additionally or alternatively, the communications manager 620 may support wireless communication at a first UE in accordance with examples as disclosed herein. The network-based location determining component 635 may be configured as or otherwise support a means for determining a location of the first UE based on one or more positioning procedures supported by the first UE, the one or more positioning procedures including at least a network-based positioning procedure. The transmitting component 640 may be configured as or otherwise support a means for transmitting, to a second UE via a sidelink communication link, a message including location information associated with the first UE, the location information including the location of the first UE.

Figure 7:
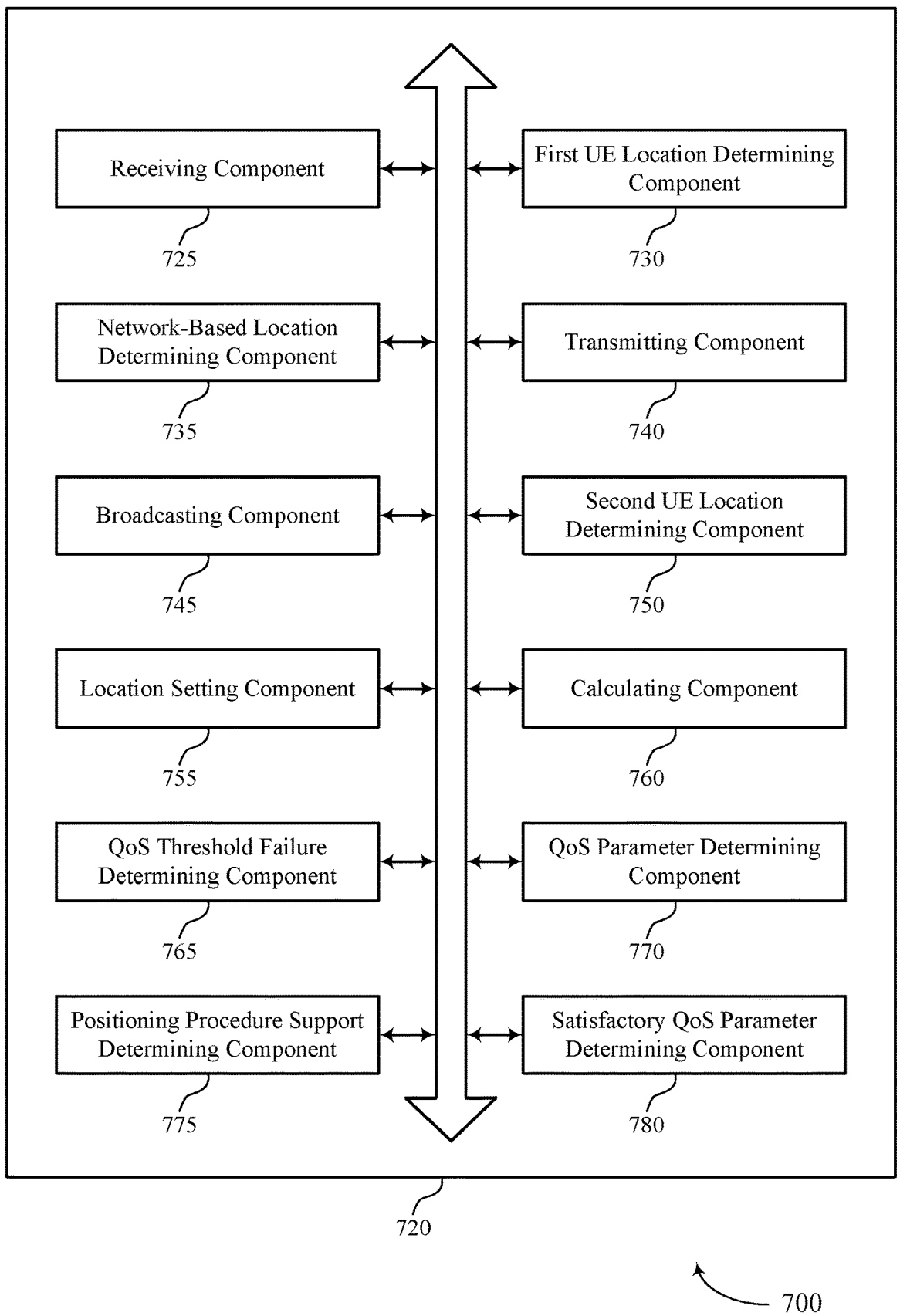
FIG. 7 shows a block diagram of a communications manager that supports network-assisted positioning for sidelink communications in accordance with aspects of the present disclosure.

FIG. 7 shows a block diagram 700 of a communications manager 720 that supports network-assisted positioning for sidelink communications in accordance with aspects of the present disclosure. The communications manager 720 may be an example of aspects of a communications manager 520, a communications manager 620, or both, as described herein. The communications manager 720, or various components thereof, may be an example of means for performing various aspects of network-assisted positioning for sidelink communications as described herein. For example, the communications manager 720 may include a receiving component 725, a first UE location determining component 730, a network-based location determining component 735, a transmitting component 740, a broadcasting component 745, a second UE location determining component 750, a location setting component 755, a calculating component 760, a QoS threshold failure determining component 765, a QoS parameter determining component 770, a positioning procedure support determining component 775, a satisfactory QoS parameter determining component 780, or any combination thereof. Each of these components may communicate, directly or indirectly, with one another (e.g., via one or more buses).

The communications manager 720 may support wireless communication at a first UE in accordance with examples as disclosed herein. The receiving component 725 may be configured as or otherwise support a means for receiving, from a second UE via a sidelink communication link, a message including location information associated with the second UE, where the message is received based on the second UE supporting one or more positioning procedures that include at least a network-based positioning procedure. The first UE location determining component 730 may be configured as or otherwise support a means for determining a location of the first UE based on the location information associated with the second UE.

In some examples, the broadcasting component 745 may be configured as or otherwise support a means for broadcasting one or more discovery messages. In some examples, the receiving component 725 may be configured as or otherwise support a means for receiving a discovery response message from the second UE based on the one or more discovery messages, where receiving the message including the location information is based on receiving the discovery response message from the second UE.

In some examples, the transmitting component 740 may be configured as or otherwise support a means for transmitting, to the second UE, a second message including a request for the location information based on receiving the discovery response message, where receiving the message including the location information associated with the second UE is in response to the second message.

In some examples, the QoS parameter determining component 770 may be configured as or otherwise support a means for determining one or more positioning QoS parameters for the first UE. In some examples, the transmitting component 740 may be configured as or otherwise support a means for transmitting, within the second message, an indication of the one or more positioning QoS parameters, where receiving the message is based on the one or more positioning QoS parameters.

In some examples, each discovery message of the one or more discovery messages includes a request for location information from one or more UEs that support the one or more positioning procedures including at least the network-based positioning procedure. In some examples, the discovery response message includes the message including the location information associated with the second UE.

In some examples, the QoS parameter determining component 770 may be configured as or otherwise support a means for determining one or more positioning QoS parameters for the first UE. In some examples, the transmitting component 740 may be configured as or otherwise support a means for transmitting, within each discovery message of the one or more discovery messages, an indication of the one or more positioning QoS parameters, where receiving the discovery response message is based on the one or more positioning QoS parameters. In some examples, the one or more positioning QoS parameters includes a positioning accuracy parameter, a latency parameter, or any combination thereof.

In some examples, the positioning procedure support determining component 775 may be configured as or otherwise support a means for determining that the second UE supports the one or more positioning procedures including at least the network-based positioning procedure based on receiving the discovery response message.

In some examples, to support determining the location of the first UE, the first UE location determining component 730 may be configured as or otherwise support a means for determining location information associated with the first UE based on a satellite-based positioning procedure performed by the first UE. In some examples, to support determining the location of the first UE, the first UE location determining component 730 may be configured as or otherwise support a means for determining the location of the first UE based on the location information associated with the first UE and the location information associated with the second UE.

In some examples, the satellite-based positioning procedure includes GNSS positioning.

In some examples, to support determining the location of the first UE, the second UE location determining component 750 may be configured as or otherwise support a means for determining a location of the second UE based on the location information associated with the second UE. In some examples, to support determining the location of the first UE, the location setting component 755 may be configured as or otherwise support a means for setting the location of the first UE as the location of the second UE.

In some examples, to support determining the location of the first UE, the calculating component 760 may be configured as or otherwise support a means for calculating a weighted average location based on the location information of the second UE. In some examples, to support determining the location of the first UE, the location setting component 755 may be configured as or otherwise support a means for setting the location of the first UE as the weighted average location.

In some examples, the QoS threshold failure determining component 765 may be configured as or otherwise support a means for determining that one or more sidelink positioning procedures performed by the first UE fail to satisfy a QoS threshold, where receiving the message including the location information associated with the second UE is based on the one or more sidelink positioning procedures performed by the first UE failing to satisfy the QoS threshold.

In some examples, the message including the location information includes a periodic safety message transmitted by the second UE.

In some examples, the second UE is approximately co-located with the first UE.

Additionally or alternatively, the communications manager 720 may support wireless communication at a first UE in accordance with examples as disclosed herein. The network-based location determining component 735 may be configured as or otherwise support a means for determining a location of the first UE based on one or more positioning procedures supported by the first UE, the one or more positioning procedures including at least a network-based positioning procedure. The transmitting component 740 may be configured as or otherwise support a means for transmitting, to a second UE via a sidelink communication link, a message including location information associated with the first UE, the location information including the location of the first UE.

In some examples, the transmitting component 740 may be configured as or otherwise support a means for transmitting a location sharing request to a base station. In some examples, the receiving component 725 may be configured as or otherwise support a means for receiving, from the base station, a second message indicating that the first UE is to share the location of the first UE based on the location sharing request, where transmitting the message to the second UE is based on receiving the second message.

In some examples, the receiving component 725 may be configured as or otherwise support a means for receiving one or more discovery messages on the sidelink communication link from the second UE. In some examples, the transmitting component 740 may be configured as or otherwise support a means for transmitting a discovery response message to the second UE based on the one or more discovery messages, where transmitting the message including the location information is based on transmitting the discovery response message from the second UE.

In some examples, the receiving component 725 may be configured as or otherwise support a means for receiving, from the second UE, a third message including a request for the location information in response to the discovery response message, where transmitting the message including the location information associated with the first UE is based on receiving the third message.

In some examples, the receiving component 725 may be configured as or otherwise support a means for receiving, within the third message, an indication of one or more positioning QoS parameters. In some examples, the satisfactory QoS parameter determining component 780 may be configured as or otherwise support a means for determining that positioning information obtained from the one or more positioning procedures supported by the first UE satisfy the one or more positioning QoS parameters, where transmitting the message is based on the one or more positioning QoS parameters.

In some examples, each discovery message of the one or more discovery messages includes a request for location information from one or more UEs that support the one or more positioning procedures including at least the network-based positioning procedure. In some examples, the discovery response message includes the message including the location information associated with the first UE.

In some examples, the receiving component 725 may be configured as or otherwise support a means for receiving, within each discovery message of the one or more discovery messages, an indication of one or more positioning QoS parameters. In some examples, the satisfactory QoS parameter determining component 780 may be configured as or otherwise support a means for determining that positioning information obtained from the one or more positioning procedures supported by the first UE satisfy the one or more positioning QoS parameters, where transmitting the discovery response message is based on the one or more positioning QoS parameters.

In some examples, the one or more positioning QoS parameters include a positioning accuracy QoS parameter, a latency QoS parameter, or any combination thereof. In some examples, to support transmitting the message including the location information associated with the first UE, the transmitting component 740 may be configured as or otherwise support a means for periodically transmitting the message to one or more UEs. In some examples, the message includes a safety message. In some examples, the first UE is approximately co-located with the second UE.

Figure 8:
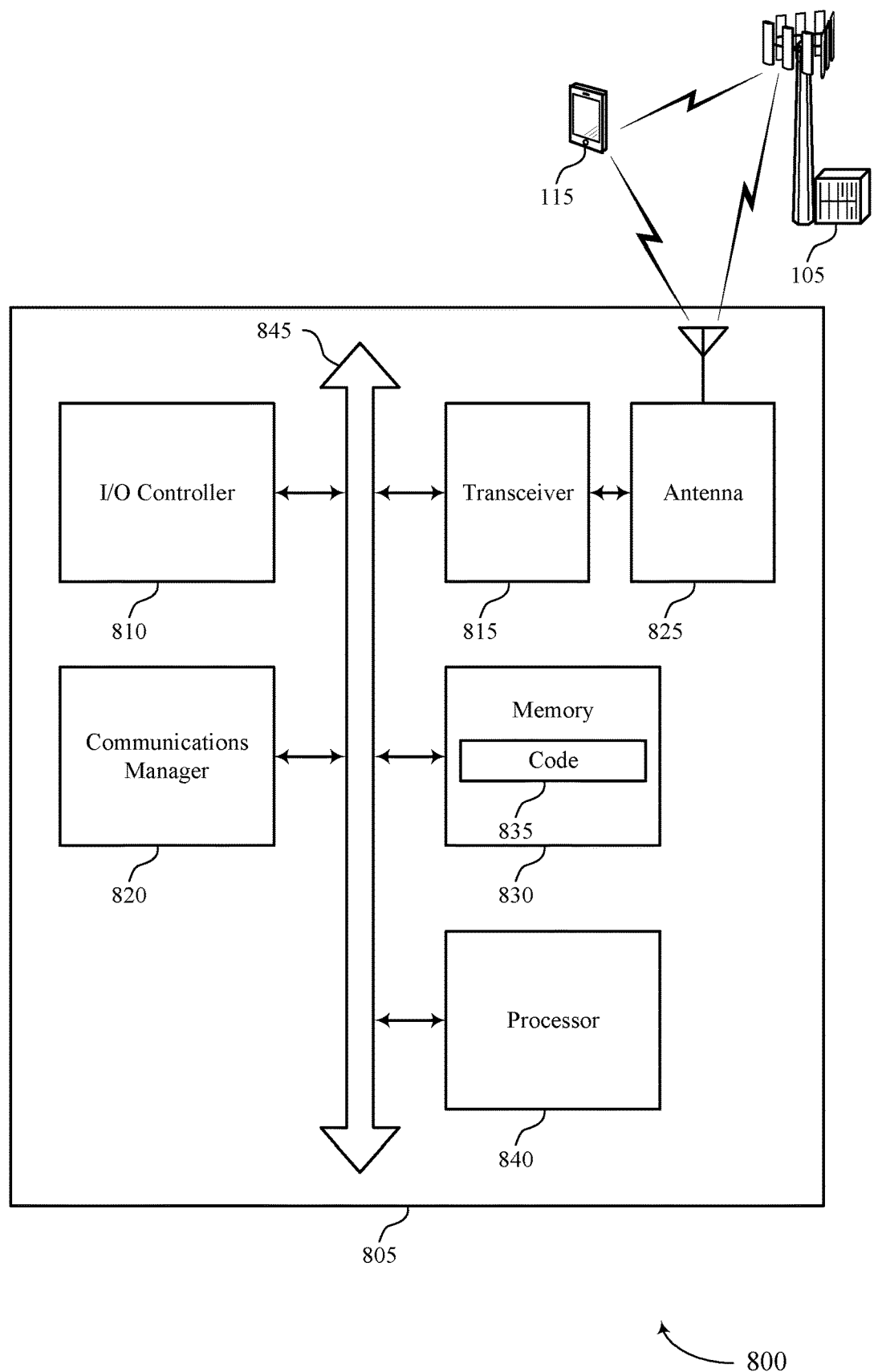
FIG. 8 shows a diagram of a system including a device that supports network-assisted positioning for sidelink communications in accordance with aspects of the present disclosure.

FIG. 8 shows a diagram of a system 800 including a device 805 that supports network-assisted positioning for sidelink communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting network-assisted positioning for sidelink communications). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving, from a second UE via a sidelink communication link, a message including location information associated with the second UE, where the message is received based on the second UE supporting one or more positioning procedures that include at least a network-based positioning procedure. The communications manager 820 may be configured as or otherwise support a means for determining a location of the first UE based on the location information associated with the second UE.

Additionally or alternatively, the communications manager 820 may support wireless communication at a first UE in accordance with examples as disclosed herein. For example, the communications manager 820 may be configured as or otherwise support a means for determining a location of the first UE based on one or more positioning procedures supported by the first UE, the one or more positioning procedures including at least a network-based positioning procedure. The communications manager 820 may be configured as or otherwise support a means for transmitting, to a second UE via a sidelink communication link, a message including location information associated with the first UE, the location information including the location of the first UE.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of network-assisted positioning for sidelink communications as described herein, or the processor 840 and the memory 830 may be otherwise configured to perform or support such operations.

Figure 9:
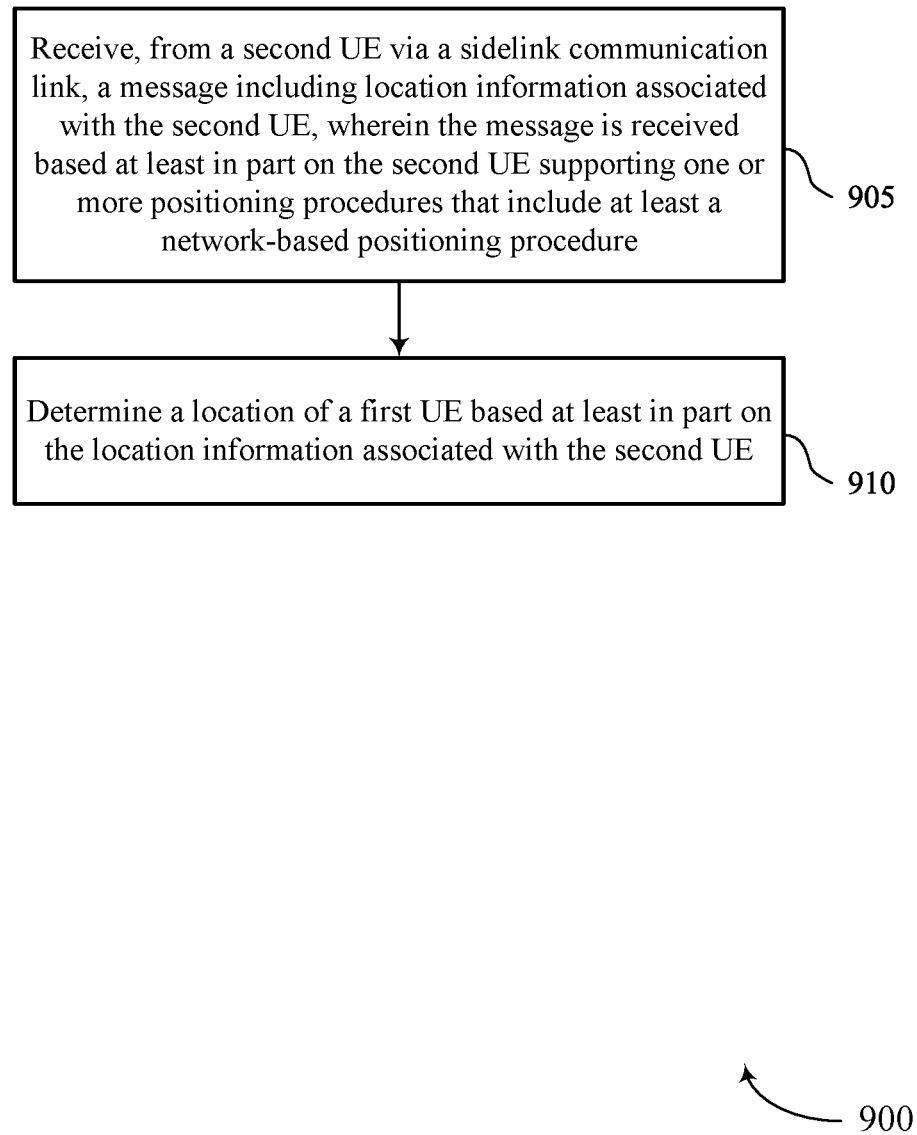
FIGS. 9 through 13 show flowcharts illustrating methods that support network-assisted positioning for sidelink communications in accordance with aspects of the present disclosure.

FIG. 9 shows a flowchart illustrating a method 900 that supports network-assisted positioning for sidelink communications in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving, from a second UE via a sidelink communication link, a message including location information associated with the second UE, where the message is received based on the second UE supporting one or more positioning procedures that include at least a network-based positioning procedure. The operations of 905 may be performed in accordance with examples as disclosed herein. In some examples, aspects of the operations of 905 may be performed by a receiving component 725 as described with reference to FIG. 7.

At 910, the method may include determining a location of a first UE based on the location information associated with the second UE. The operations of 910 may be performed in accordance with examples as disclosed herein. In some examples, aspects of the operations of 910 may be performed by a first UE location determining component 730 as described with reference to FIG. 7.

Figure 10:
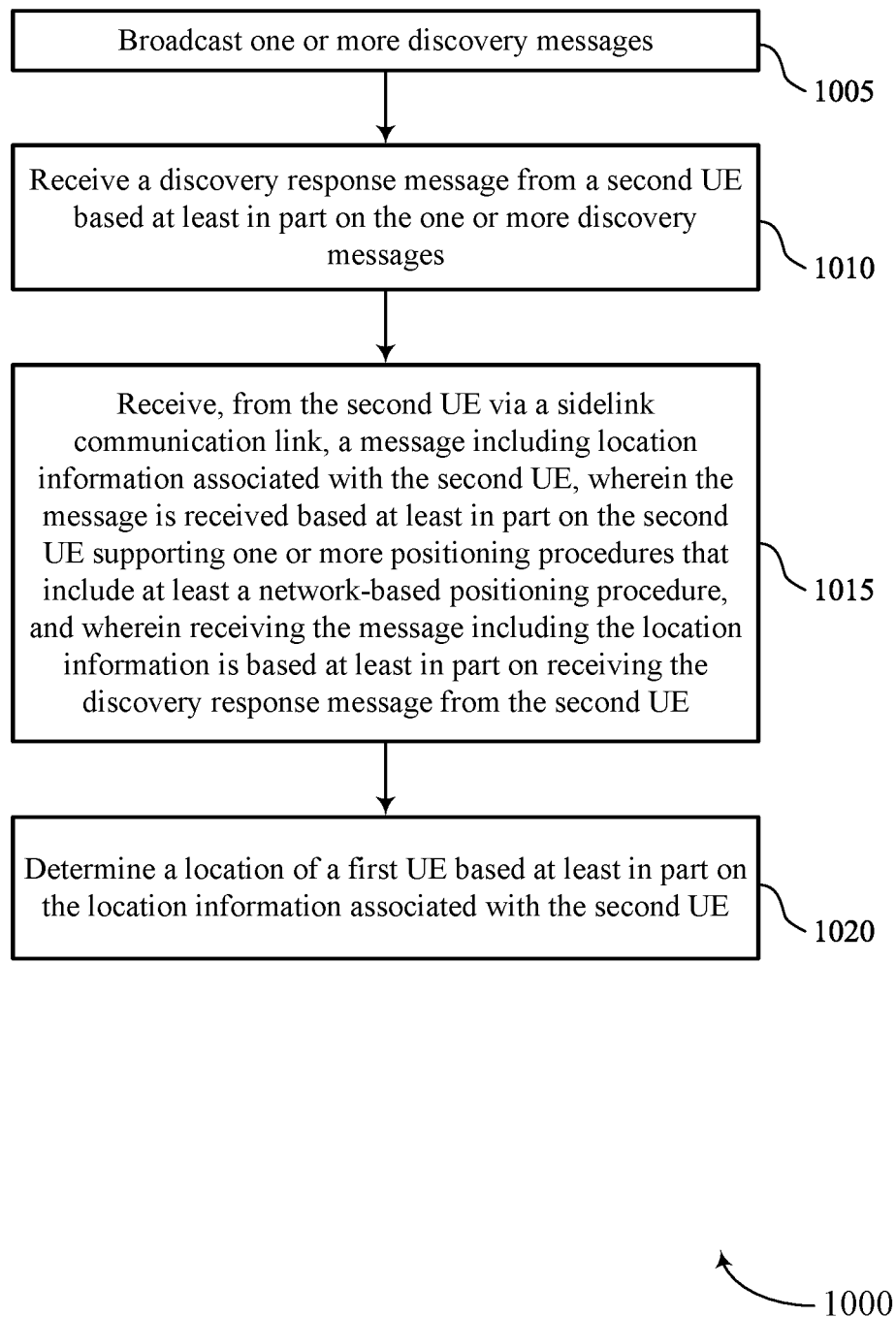

FIG. 10 shows a flowchart illustrating a method 1000 that supports network-assisted positioning for sidelink communications in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include broadcasting one or more discovery messages. The operations of 1005 may be performed in accordance with examples as disclosed herein. In some examples, aspects of the operations of 1005 may be performed by a broadcasting component 745 as described with reference to FIG. 7.

At 1010, the method may include receiving a discovery response message from a second UE based on the one or more discovery messages. The operations of 1010 may be performed in accordance with examples as disclosed herein. In some examples, aspects of the operations of 1010 may be performed by a receiving component 725 as described with reference to FIG. 7.

At 1015, the method may include receiving, from the second UE via a sidelink communication link, a message including location information associated with the second UE, where the message is received based on the second UE supporting one or more positioning procedures that include at least a network-based positioning procedure, and where receiving the message including the location information is based on receiving the discovery response message from the second UE. The operations of 1015 may be performed in accordance with examples as disclosed herein. In some examples, aspects of the operations of 1015 may be performed by a receiving component 725 as described with reference to FIG. 7.

At 1020, the method may include determining a location of a first UE based on the location information associated with the second UE. The operations of 1020 may be performed in accordance with examples as disclosed herein. In some examples, aspects of the operations of 1020 may be performed by a first UE location determining component 730 as described with reference to FIG. 7.

Figure 11:
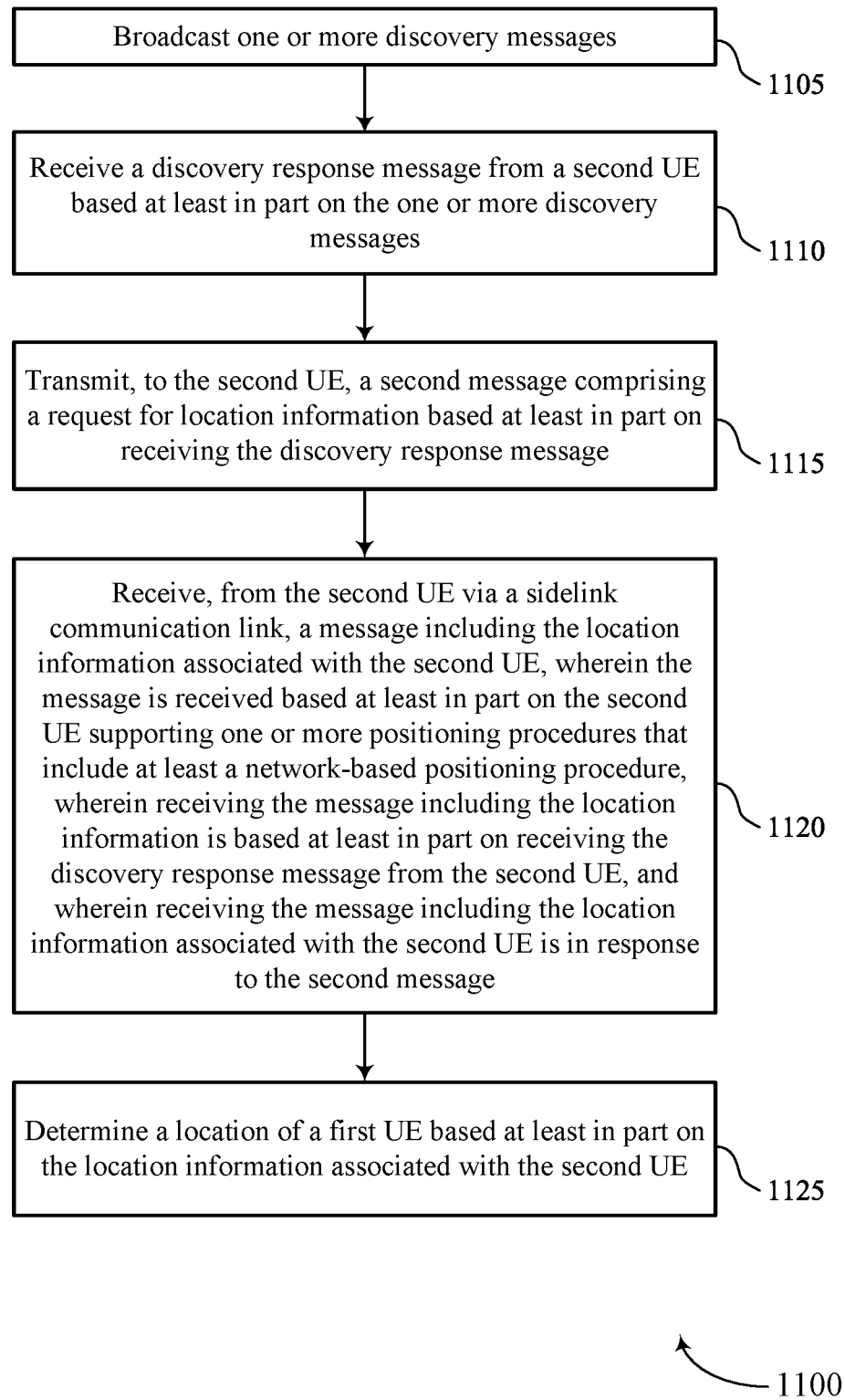

FIG. 11 shows a flowchart illustrating a method 1100 that supports network-assisted positioning for sidelink communications in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include broadcasting one or more discovery messages. The operations of 1105 may be performed in accordance with examples as disclosed herein. In some examples, aspects of the operations of 1105 may be performed by a broadcasting component 745 as described with reference to FIG. 7.

At 1110, the method may include receiving a discovery response message from a second UE based on the one or more discovery messages. The operations of 1110 may be performed in accordance with examples as disclosed herein. In some examples, aspects of the operations of 1110 may be performed by a receiving component 725 as described with reference to FIG. 7.

At 1115, the method may include transmitting, to the second UE, a second message including a request for location information based on receiving the discovery response message. The operations of 1115 may be performed in accordance with examples as disclosed herein. In some examples, aspects of the operations of 1115 may be performed by a transmitting component 740 as described with reference to FIG. 7.

At 1120, the method may include receiving, from the second UE via a sidelink communication link, a message including the location information associated with the second UE, where the message is received based on the second UE supporting one or more positioning procedures that include at least a network-based positioning procedure, where receiving the message including the location information is based on receiving the discovery response message from the second UE, and where receiving the message including the location information associated with the second UE is in response to the second message. The operations of 1120 may be performed in accordance with examples as disclosed herein. In some examples, aspects of the operations of 1120 may be performed by a receiving component 725 as described with reference to FIG. 7.

At 1125, the method may include determining a location of a first UE based on the location information associated with the second UE. The operations of 1125 may be performed in accordance with examples as disclosed herein. In some examples, aspects of the operations of 1125 may be performed by a first UE location determining component 730 as described with reference to FIG. 7.

Figure 12:
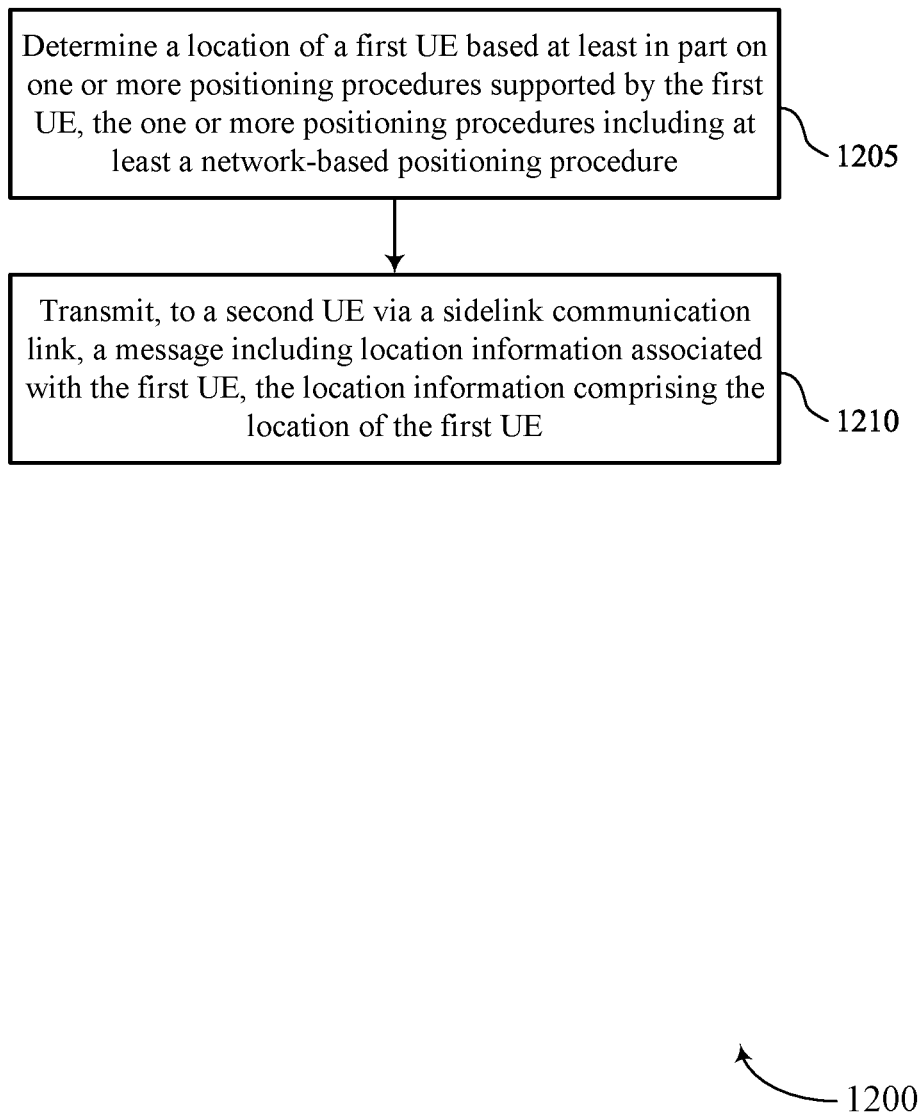

FIG. 12 shows a flowchart illustrating a method 1200 that supports network-assisted positioning for sidelink communications in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include determining a location of a first UE based on one or more positioning procedures supported by the first UE, the one or more positioning procedures including at least a network-based positioning procedure. The operations of 1205 may be performed in accordance with examples as disclosed herein. In some examples, aspects of the operations of 1205 may be performed by a network-based location determining component 735 as described with reference to FIG. 7.

At 1210, the method may include transmitting, to a second UE via a sidelink communication link, a message including location information associated with the first UE, the location information including the location of the first UE. The operations of 1210 may be performed in accordance with examples as disclosed herein. In some examples, aspects of the operations of 1210 may be performed by a transmitting component 740 as described with reference to FIG. 7.

Figure 13:
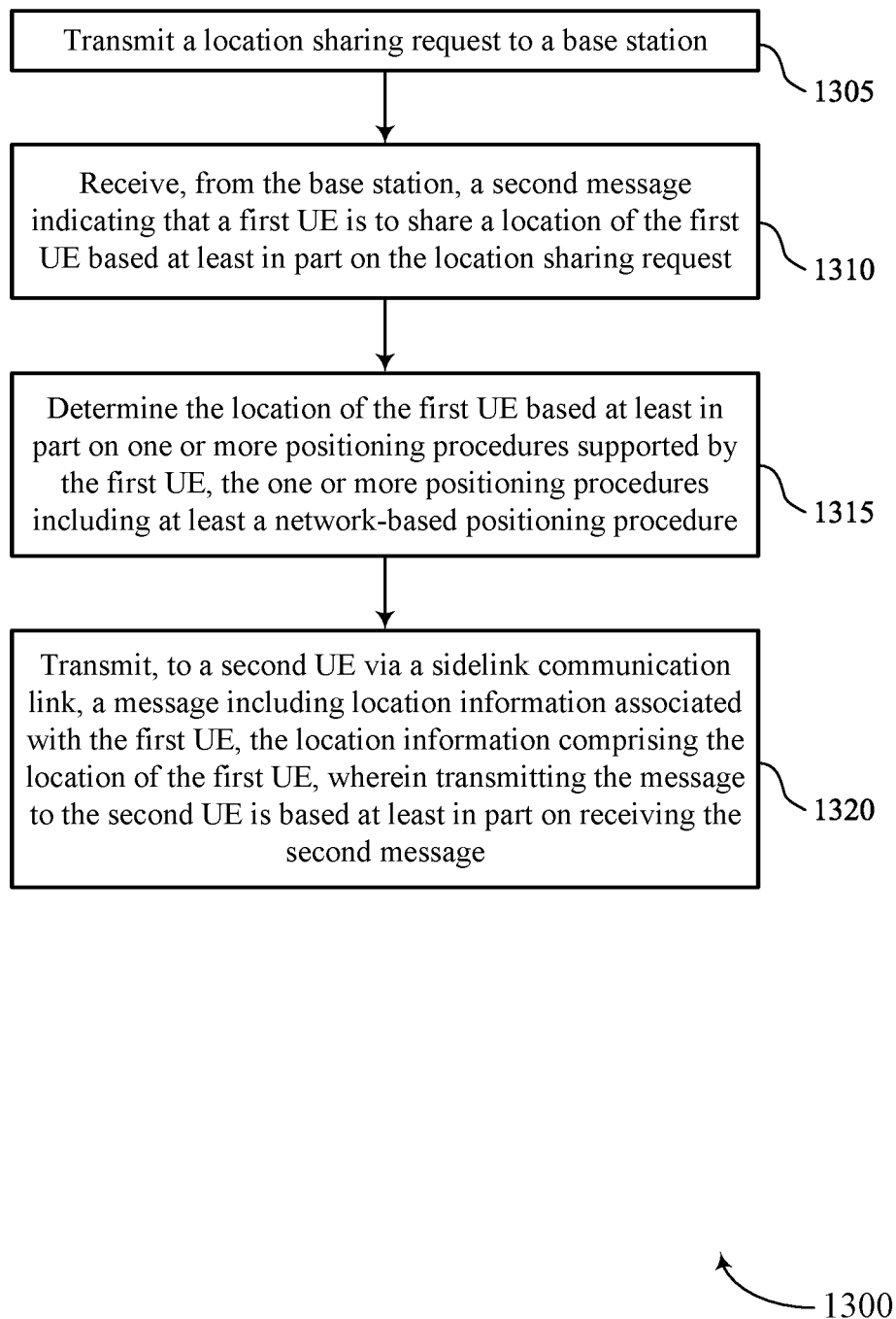

FIG. 13 shows a flowchart illustrating a method 1300 that supports network-assisted positioning for sidelink communications in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting a location sharing request to a base station. The operations of 1305 may be performed in accordance with examples as disclosed herein. In some examples, aspects of the operations of 1305 may be performed by a transmitting component 740 as described with reference to FIG. 7.

At 1310, the method may include receiving, from the base station, a second message indicating that a first UE is to share a location of the first UE based on the location sharing request. The operations of 1310 may be performed in accordance with examples as disclosed herein. In some examples, aspects of the operations of 1310 may be performed by a receiving component 725 as described with reference to FIG. 7.

At 1315, the method may include determining the location of a first UE based on one or more positioning procedures supported by the first UE, the one or more positioning procedures including at least a network-based positioning procedure. The operations of 1315 may be performed in accordance with examples as disclosed herein. In some examples, aspects of the operations of 1315 may be performed by a network-based location determining component 735 as described with reference to FIG. 7.

At 1320, the method may include transmitting, to a second UE via a sidelink communication link, a message including location information associated with the first UE, the location information including the location of the first UE, where transmitting the message to the second UE is based on receiving the second message. The operations of 1320 may be performed in accordance with examples as disclosed herein. In some examples, aspects of the operations of 1320 may be performed by a transmitting component 740 as described with reference to FIG. 7.

The following provides an overview of aspects of the present disclosure:

Aspect 1: A method for wireless communication at a first UE, comprising: receiving, from a second UE via a sidelink communication link, a message including location information associated with the second UE, wherein the message is received based at least in part on the second UE supporting one or more positioning procedures that include at least a network-based positioning procedure; and determining a location of the first UE based at least in part on the location information associated with the second UE.

Aspect 2: The method of aspect 1, further comprising: broadcasting one or more discovery messages; and receiving a discovery response message from the second UE based at least in part on the one or more discovery messages, wherein receiving the message including the location information is based at least in part on receiving the discovery response message from the second UE.

Aspect 3: The method of aspect 2, further comprising: transmitting, to the second UE, a second message comprising a request for the location information based at least in part on receiving the discovery response message, wherein receiving the message including the location information associated with the second UE is in response to the second message.

Aspect 4: The method of aspect 3, further comprising: determining one or more positioning quality of service parameters for the first UE; and transmitting, within the second message, an indication of the one or more positioning quality of service parameters, wherein receiving the message is based at least in part on the one or more positioning quality of service parameters.

Aspect 5: The method of any of aspects 2 through 4, wherein each discovery message of the one or more discovery messages comprises a request for location information from one or more UEs that support the one or more positioning procedures including at least the network-based positioning procedure.

Aspect 6: The method of any of aspects 2 through 5, wherein the discovery response message comprises the message including the location information associated with the second UE.

Aspect 7: The method of any of aspects 2 through 6, further comprising: determining one or more positioning quality of service parameters for the first UE; and transmitting, within each discovery message of the one or more discovery messages, an indication of the one or more positioning quality of service parameters, wherein receiving the discovery response message is based at least in part on the one or more positioning quality of service parameters.

Aspect 8: The method of aspect 7, wherein the one or more positioning quality of service parameters comprises a positioning accuracy parameter, a latency parameter, or any combination thereof.

Aspect 9: The method of any of aspects 2 through 8, further comprising: determining that the second UE supports the one or more positioning procedures including at least the network-based positioning procedure based at least in part on receiving the discovery response message.

Aspect 10: The method of any of aspects 1 through 9, wherein determining the location of the first UE comprises: determining location information associated with the first UE based at least in part on a satellite-based positioning procedure performed by the first UE; and determining the location of the first UE based at least in part on the location information associated with the first UE and the location information associated with the second UE.

Aspect 11: The method of aspect 10, wherein the satellite-based positioning procedure comprises GNSS positioning.

Aspect 12: The method of any of aspects 1 through 11, wherein determining the location of the first UE comprises: determining a location of the second UE based at least in part on the location information associated with the second UE; and setting the location of the first UE as the location of the second UE.

Aspect 13: The method of any of aspects 1 through 12, wherein determining the location of the first UE comprises: calculating a weighted average location based at least in part on the location information of the second UE; and setting the location of the first UE as the weighted average location.

Aspect 14: The method of any of aspects 1 through 13, further comprising: determining that one or more sidelink positioning procedures performed by the first UE fail to satisfy a quality of service threshold, wherein receiving the message including the location information associated with the second UE is based at least in part on the one or more sidelink positioning procedures performed by the first UE failing to satisfy the quality of service threshold.

Aspect 15: The method of any of aspects 1 through 14, wherein the message including the location information comprises a periodic safety message transmitted by the second UE.

Aspect 16: The method of any of aspects 1 through 15, wherein the second UE is approximately co-located with the first UE.

Aspect 17: A method for wireless communication at a first UE, comprising: determining a location of the first UE based at least in part on one or more positioning procedures supported by the first UE, the one or more positioning procedures including at least a network-based positioning procedure; and transmitting, to a second UE via a sidelink communication link, a message including location information associated with the first UE, the location information comprising the location of the first UE.

Aspect 18: The method of aspect 17, further comprising: transmitting a location sharing request to a base station; and receiving, from the base station, a second message indicating that the first UE is to share the location of the first UE based at least in part on the location sharing request, wherein transmitting the message to the second UE is based at least in part on receiving the second message.

Aspect 19: The method of any of aspects 17 through 18, further comprising: receiving one or more discovery messages on the sidelink communication link from the second UE; and transmitting a discovery response message to the second UE based at least in part on the one or more discovery messages, wherein transmitting the message including the location information is based at least in part on transmitting the discovery response message from the second UE.

Aspect 20: The method of aspect 19, further comprising: receiving, from the second UE, a third message comprising a request for the location information in response to the discovery response message, wherein transmitting the message including the location information associated with the first UE is based at least in part on receiving the third message.

Aspect 21: The method of aspect 20, further comprising: receiving, within the third message, an indication of one or more positioning quality of service parameters; and determining that positioning information obtained from the one or more positioning procedures supported by the first UE satisfy the one or more positioning quality of service parameters, wherein transmitting the message is based at least in part on the one or more positioning quality of service parameters.

Aspect 22: The method of any of aspects 19 through 21, wherein each discovery message of the one or more discovery messages comprises a request for location information from one or more UEs that support the one or more positioning procedures including at least the network-based positioning procedure.

Aspect 23: The method of any of aspects 19 through 22, wherein the discovery response message comprises the message including the location information associated with the first UE.

Aspect 24: The method of any of aspects 19 through 23, further comprising: receiving, within each discovery message of the one or more discovery messages, an indication of one or more positioning quality of service parameters; and determining that positioning information obtained from the one or more positioning procedures supported by the first UE satisfy the one or more positioning quality of service parameters, wherein transmitting the discovery response message is based at least in part on the one or more positioning quality of service parameters.

Aspect 25: The method of aspect 24, wherein the one or more positioning quality of service parameters comprise a positioning accuracy quality of service parameter, a latency quality of service parameter, or any combination thereof.

Aspect 26: The method of any of aspects 17 through 25, wherein transmitting the message including the location information associated with the first UE comprises: periodically transmitting the message to one or more UEs.

Aspect 27: The method of aspect 26, wherein the message comprises a safety message.

Aspect 28: The method of any of aspects 17 through 27, wherein the first UE is approximately co-located with the second UE.

Aspect 29: An apparatus for wireless communication at a first UE, comprising a processor; memory coupled with the processor; and instructions stored in the memory and executable by the processor to cause the apparatus to perform a method of any of aspects 1 through 16.

Aspect 30: An apparatus for wireless communication at a first UE, comprising at least one means for performing a method of any of aspects 1 through 16.

Aspect 31: A non-transitory computer-readable medium storing code for wireless communication at a first UE, the code comprising instructions executable by a processor to perform a method of any of aspects 1 through 16.

Aspect 32: An apparatus for wireless communication at a first UE, comprising a processor; memory coupled with the processor; and instructions stored in the memory and executable by the processor to cause the apparatus to perform a method of any of aspects 17 through 28.

Aspect 33: An apparatus for wireless communication at a first UE, comprising at least one means for performing a method of any of aspects 17 through 28.

Aspect 34: A non-transitory computer-readable medium storing code for wireless communication at a first UE, the code comprising instructions executable by a processor to perform a method of any of aspects 17 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
   a processor;
   memory coupled with the processor; and
   instructions stored in the memory and executable by the processor to cause the apparatus to:
      receive, from a second UE via a sidelink communication link, a message including location information associated with the second UE, wherein the location information includes a location of the second UE, and wherein the location of the second UE is based at least in part on a network-based positioning procedure that determines location via a Uu interface; and
      determine a location of the first UE based at least in part on the location information associated with the second UE, wherein the instructions to determine the location of the first UE are executable by the processor to cause the apparatus to set the location of the first UE as the location of the second UE.

2. The apparatus of claim 1, wherein the instructions are further executable by the processor to cause the apparatus to:
   broadcast one or more discovery messages; and
   receive a discovery response message from the second UE based at least in part on the one or more discovery messages, wherein receiving the message including the location information is based at least in part on receiving the discovery response message from the second UE.

3. The apparatus of claim 2, wherein the instructions are further executable by the processor to cause the apparatus to:
   transmit, to the second UE, a second message comprising a request for the location information based at least in part on receiving the discovery response message, wherein receiving the message including the location information associated with the second UE is in response to the second message.

4. The apparatus of claim 3, wherein the instructions are further executable by the processor to cause the apparatus to:
   determine one or more positioning quality of service parameters for the first UE; and
   transmit, within the second message, an indication of the one or more positioning quality of service parameters, wherein receiving the message is based at least in part on the one or more positioning quality of service parameters.

5. The apparatus of claim 2, wherein each discovery message of the one or more discovery messages comprises a request for location information from one or more UEs that support one or more positioning procedures including at least the network-based positioning procedure.

6. The apparatus of claim 2, wherein the discovery response message comprises the message including the location information associated with the second UE.

7. The apparatus of claim 2, wherein the instructions are further executable by the processor to cause the apparatus to:
   determine one or more positioning quality of service parameters for the first UE; and
   transmit, within each discovery message of the one or more discovery messages, an indication of the one or more positioning quality of service parameters, wherein receiving the discovery response message is based at least in part on the one or more positioning quality of service parameters.

8. The apparatus of claim 7, wherein the one or more positioning quality of service parameters comprises a positioning accuracy parameter, a latency parameter, or any combination thereof.

9. The apparatus of claim 2, wherein the instructions are further executable by the processor to cause the apparatus to:
determine that the second UE supports one or more positioning procedures including at least the network-based positioning procedure based at least in part on receiving the discovery response message.

10. The apparatus of claim 1, wherein the instructions to determine the location of the first UE are executable by the processor to cause the apparatus to:
determine location information associated with the first UE based at least in part on a satellite-based positioning procedure performed by the first UE; and
determine the location of the first UE based at least in part on the location information associated with the first UE and the location information associated with the second UE.

11. The apparatus of claim 10, wherein the satellite-based positioning procedure comprises global navigation satellite system (GNSS) positioning.

12. The apparatus of claim 1, wherein the instructions to determine the location of the first UE are executable by the processor to cause the apparatus to:
calculate a weighted average location based at least in part on the location information of the second UE; and
set the location of the first UE as the weighted average location.

13. The apparatus of claim 1, wherein the instructions are further executable by the processor to cause the apparatus to:
determine that one or more sidelink positioning procedures performed by the first UE fail to satisfy a quality of service threshold, wherein receiving the message including the location information associated with the second UE is based at least in part on the one or more sidelink positioning procedures performed by the first UE failing to satisfy the quality of service threshold.

14. The apparatus of claim 1, wherein the message including the location information comprises a periodic safety message transmitted by the second UE.

15. The apparatus of claim 1, wherein the second UE is approximately co-located with the first UE.

16. An apparatus for wireless communication at a first user equipment (UE), comprising:
a processor;
memory coupled with the processor; and
instructions stored in the memory and executable by the processor to cause the apparatus to:
determine a location of the first UE based at least in part on one or more positioning procedures supported by the first UE, the one or more positioning procedures including at least a network-based positioning procedure, wherein the network-based positioning procedure determines its location via a Uu interface;
transmit a location sharing request to a base station;
receive, from the base station, a second message indicating that the first UE is to share the location of the first UE based at least in part on the location sharing request; and
transmit, to a second UE via a sidelink communication link, a message that includes location information associated with the first UE to facilitate determination of the location of the second UE, the location information comprising the location of the first UE, wherein transmitting the message to the second UE is based at least in part on receiving the second message.

17. The apparatus of claim 16, wherein the instructions are further executable by the processor to cause the apparatus to:
receive one or more discovery messages on the sidelink communication link from the second UE; and
transmit a discovery response message to the second UE based at least in part on the one or more discovery messages, wherein transmitting the message including the location information is based at least in part on transmitting the discovery response message from the second UE.

18. The apparatus of claim 17, wherein the instructions are further executable by the processor to cause the apparatus to:
receive, from the second UE, a third message comprising a request for the location information in response to the discovery response message, wherein transmitting the message including the location information associated with the first UE is based at least in part on receiving the third message.

19. The apparatus of claim 18, wherein the instructions are further executable by the processor to cause the apparatus to:
receive, within the third message, an indication of one or more positioning quality of service parameters; and
determine that positioning information obtained from the one or more positioning procedures supported by the first UE satisfy the one or more positioning quality of service parameters, wherein transmitting the message is based at least in part on the one or more positioning quality of service parameters.

20. The apparatus of claim 17, wherein each discovery message of the one or more discovery messages comprises a request for location information from one or more UEs that support the one or more positioning procedures including at least the network-based positioning procedure.

21. The apparatus of claim 17, wherein the discovery response message comprises the message including the location information associated with the first UE.

22. The apparatus of claim 17, wherein the instructions are further executable by the processor to cause the apparatus to:
receive, within each discovery message of the one or more discovery messages, an indication of one or more positioning quality of service parameters; and
determine that positioning information obtained from the one or more positioning procedures supported by the first UE satisfy the one or more positioning quality of service parameters, wherein transmitting the discovery response message is based at least in part on the one or more positioning quality of service parameters.

23. The apparatus of claim 22, wherein the one or more positioning quality of service parameters comprise a positioning accuracy quality of service parameter, a latency quality of service parameter, or any combination thereof.

24. The apparatus of claim 16, wherein the instructions to transmit the message including the location information associated with the first UE are executable by the processor to cause the apparatus to:
periodically transmit the message to one or more UEs.

25. The apparatus of claim 24, wherein the message comprises a safety message.

26. The apparatus of claim 16, wherein the first UE is approximately co-located with the second UE.

27. A method for wireless communication at a first user equipment (UE), comprising:
receiving, from a second UE via a sidelink communication link, a message including location information associated with the second UE, wherein the location information includes the location of the second UE, and wherein the location of the second UE is based at least in part on a network-based positioning procedure that determines location via a Uu interface; and
determining a location of the first UE based at least in part on the location information associated with the second UE, wherein determining the location of the first UE includes setting the location of the first UE as the location of the second UE.

28. A method for wireless communication at a first user equipment (UE), comprising:
determining a location of the first UE based at least in part on one or more positioning procedures supported by the first UE, the one or more positioning procedures including at least a network-based positioning procedure, wherein the network-based positioning procedure determines its location via a Uu interface;
transmitting a location sharing request to a base station;
receiving, from the base station, a second message indicating that the first UE is to share the location of the first UE based at least in part on the location sharing request; and
transmitting, to a second UE via a sidelink communication link, a message that includes location information associated with the first UE to facilitate determination of the location of the second UE, the location information comprising the location of the first UE, wherein transmitting the message to the second UE is based at least in part on receiving the second message.

\* \* \* \* \*